United States Patent
Oniwa et al.

(10) Patent No.: US 10,220,847 B2
(45) Date of Patent: Mar. 5, 2019

(54) VEHICLE CONTROL APPARATUS, VEHICLE CONTROL METHOD, AND VEHICLE CONTROL PROGRAM

(71) Applicant: HONDA MOTOR CO., LTD., Tokyo (JP)

(72) Inventors: Yoshihiro Oniwa, Utsunomiya (JP); Mineyuki Yoshida, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 5 days.

(21) Appl. No.: 15/297,250

(22) Filed: Oct. 19, 2016

(65) Prior Publication Data
US 2017/0120909 A1 May 4, 2017

(30) Foreign Application Priority Data
Oct. 28, 2015 (JP) ................................. 2015-212112

(51) Int. Cl.
*B60W 30/14* (2006.01)
*B60W 30/12* (2006.01)
(Continued)

(52) U.S. Cl.
CPC .......... *B60W 30/143* (2013.01); *B60W 30/12* (2013.01); *B60W 30/16* (2013.01); *B60W 30/18163* (2013.01); *G05D 1/0212* (2013.01)

(58) Field of Classification Search
CPC ................. G05D 1/00; B60W 30/143
See application file for complete search history.

(56) References Cited

U.S. PATENT DOCUMENTS 6,934,615 B2 * 8/2005 Flann ................... A01B 69/008
 172/2
7,216,033 B2 * 5/2007 Flann ................... A01B 79/005
 701/533
(Continued)

FOREIGN PATENT DOCUMENTS

JP A-2000-177428 6/2000
JP A-2009-184675 8/2009
(Continued)

OTHER PUBLICATIONS

JP Office Action dated Jun. 13, 2017 from corresponding Japanese patent application No. 2015-212112 (with attached English-language translation).

*Primary Examiner* — Alex C Dunn
(74) *Attorney, Agent, or Firm* — Drinker Biddle & Reath LLP

(57) ABSTRACT

A vehicle control apparatus includes a trajectory generation unit configured to generate a locus of a position of an own vehicle for each predetermined time in a future as a trajectory of the own vehicle, a target speed calculation unit configured to calculate a target speed of the own vehicle for each position on the trajectory generated by the trajectory generation unit, a traveling control unit configured to control traveling of the own vehicle on the basis of the target speed calculated by the target speed calculation unit, a derivation unit configured to derive a difference between a position on the trajectory generated by the trajectory generation unit and a current position of the own vehicle every time the predetermined time elapses, and a correction unit configured to correct the target speed calculated by the target speed calculation unit on the basis of the difference derived by the derivation unit.

5 Claims, 15 Drawing Sheets

(51) Int. Cl.
*B60W 30/16* (2012.01)
*B60W 30/18* (2012.01)
*G05D 1/02* (2006.01)

(56) References Cited

U.S. PATENT DOCUMENTS

| | | | | |
|---|---|---|---|---|
| 7,228,214 | B2* | 6/2007 | Flann | A01B 69/008 |
| | | | | 701/50 |
| 7,313,404 | B2* | 12/2007 | Anderson | G01C 21/28 |
| | | | | 455/456.1 |
| 8,543,261 | B2* | 9/2013 | Anderson | B60W 30/09 |
| | | | | 701/3 |
| 8,914,181 | B2* | 12/2014 | Essame | B60W 30/18163 |
| | | | | 701/23 |
| 9,090,279 | B2* | 7/2015 | Buerkle | B60W 50/0098 |
| 9,310,222 | B1* | 4/2016 | Suiter | G01C 23/005 |
| 2008/0208453 | A1* | 8/2008 | Fujimoto | G01C 21/3446 |
| | | | | 701/533 |
| 2009/0018762 | A1* | 1/2009 | Sheikh | G01C 21/02 |
| | | | | 701/513 |
| 2013/0110343 | A1 | 5/2013 | Ichikawa et al. | |
| 2014/0246541 | A1* | 9/2014 | Feyzeau | B64C 19/00 |
| | | | | 244/1 N |

FOREIGN PATENT DOCUMENTS

| | | |
|---|---|---|
| JP | A-2015-158844 | 9/2015 |
| WO | WO-2011/158347 A1 | 12/2011 |

* cited by examiner

FIG. 9

| TIME | t0 | t1 | t2 | ... | th-1 | th |
|---|---|---|---|---|---|---|
| TARGET POSITION | K(0) | K(1) | K(2) | ... | K(n-1) | K(n) |
| PRIMARY TARGET SPEED | $\nu_f 0$ | $\nu_f 1$ | $\nu_f 2$ | ... | $\nu_f n-1$ | $\nu_f n$ |
| SECONDARY TARGET SPEED | $\nu_s 0$ | $\nu_s 1$ | $\nu_s 2$ | ... | $\nu_s n-1$ | — |

$$v\#2 = v_s2 + K_{pn}\Delta x2 + K_{in}\int_0^t \Delta x2 \cdot dt + K_{dn}\frac{d\Delta x2}{dt}$$

VEHICLE CONTROL APPARATUS, VEHICLE CONTROL METHOD, AND VEHICLE CONTROL PROGRAM

CROSS REFERENCE TO RELATED APPLICATIONS

Priority is claimed on Japanese Patent Application No. 2015-212112, filed Oct. 28, 2015, the content of which is incorporated herein by reference.

BACKGROUND OF THE INVENTION

Field of the Invention

The present invention relates to a vehicle control apparatus, a vehicle control method, and a vehicle control program.

Description of Related Art

Research on technology for automatically driving a vehicle such as a four-wheeled vehicle has recently progressed.

In relation to this technology, there is a driving assistance device including an instruction means for issuing an instruction for starting automatic driving according to an operation of a driver, a setting means for setting a destination of the automatic driving, a determination means for determining a mode of the automatic driving according to whether a destination has been set when the driver operates the instruction means, and a control means for controlling the traveling of a vehicle on the basis of the mode of the automatic driving determined by the determination means, wherein the determination means determines the mode of the automatic driving as the automatic driving in which the vehicle travels along a current travel route of an own vehicle or an automatic stop when a destination is not set (for example, see WO 2011/158347).

SUMMARY OF THE INVENTION

However, in the conventional technology, it may be impossible to move the vehicle to a predetermined position at a desired timing.

An aspect according to the present invention has been made in view of such circumstances, and an objective of the aspect is to provide a vehicle control apparatus, a vehicle control method, and a vehicle control program capable of moving a vehicle to a predetermined position at a desired timing.

To achieve the above-mentioned objective, the present invention adopts the following aspects.

(1) According to an aspect of the present invention, a vehicle control apparatus is provided including: a trajectory generation unit configured to generate a locus of a position of an own vehicle for each predetermined time in a future as a trajectory of the own vehicle; a target speed calculation unit configured to calculate a target speed of the own vehicle for each position on the trajectory generated by the trajectory generation unit; a traveling control unit configured to control traveling of the own vehicle on the basis of the target speed calculated by the target speed calculation unit; a derivation unit configured to derive a difference between a position on the trajectory generated by the trajectory generation unit and a current position of the own vehicle every time the predetermined time elapses; and a correction unit configured to correct the target speed calculated by the target speed calculation unit on the basis of the difference derived by the derivation unit.

(2) In aspect (1), the derivation unit may further derive a difference between the position on the trajectory generated by the trajectory generation unit and a predicted arrival position of the own vehicle which is predicted where the own vehicle arrives after the predetermined time lapses if the own vehicle travels on the basis of the target speed calculated by the target speed calculation unit.

(3) In aspect (2), the correction unit may correct the target speed calculated by the target speed calculation unit on the basis of one or both of the difference between the position on the trajectory generated by the trajectory generation unit and the current position of the own vehicle, and the difference between the position on the trajectory generated by the trajectory generation unit and the predicted arrival position of the own vehicle.

(4) In any one of aspects (1) to (3), the target speed calculation unit may advance a time phase to calculate the target speed on the basis of a primary target speed for each position derived from the position on the trajectory generated by the trajectory generation unit.

(5) In any one of aspects (1) to (4), when the own vehicle changes lanes, the correction unit may correct the target speed calculated by the target speed calculation unit on the basis of the difference derived by the derivation unit.

(6) According to an aspect of the present invention, a vehicle control method of an on-vehicle computer is provided, the method including: generating a locus of a position of an own vehicle for each predetermined time in a future as a trajectory of the own vehicle; calculating a target speed of the own vehicle for each position on the generated trajectory; controlling traveling of the own vehicle on the basis of the calculated target speed; deriving a difference between a position on the generated trajectory and a current position of the own vehicle every time the predetermined time elapses; and correcting the calculated target speed on the basis of the derived difference.

(7) According to an aspect of the present invention, a vehicle control program is provided for causing an on-vehicle computer to: generate a locus of a position of an own vehicle for each predetermined time in a future as a trajectory of the own vehicle; calculate a target speed of the own vehicle for each position on the generated trajectory; control traveling of the own vehicle on the basis of the calculated target speed; derive a difference between a position on the generated trajectory and a current position of the own vehicle every time the predetermined time elapses; and correct the calculated target speed on the basis of the derived difference.

According to aspect (1), (6), or (7), it is possible to move the vehicle to a desired position at a desired timing because the target speed of the own vehicle is corrected on the basis of the difference between the position of the own vehicle for each predetermined time in the future and the current position of the own vehicle.

According to aspect (2) or (3), it is possible to more precisely move the vehicle to a desired position at a desired timing because the target speed of the own vehicle is corrected on the basis of the difference between the position of the own vehicle for each predetermined time in the future and the current position of the own vehicle based on the target speed.

According to aspect (4), it is possible to increase responsiveness of a device of a control target because a time phase is advanced and the target speed is calculated on the basis of a primary target speed for each position on the trajectory.

According to aspect (5), it is possible to prevent an own vehicle M from arriving at a position of a lane change before (or after) a predetermined schedule because the target speed is corrected when the own vehicle changes lanes.

BRIEF DESCRIPTION OF THE DRAWINGS

FIG. 9 is a diagram illustrating a process of calculating secondary target speed $v_s$ using a target speed calculation unit 130 in the first embodiment.

DETAILED DESCRIPTION OF THE INVENTION

Hereinafter, embodiments of a vehicle control apparatus, a vehicle control method, and a vehicle control program of the present invention will be described with reference to the drawings.

First Embodiment

[Vehicle Configuration]

Figure 1:
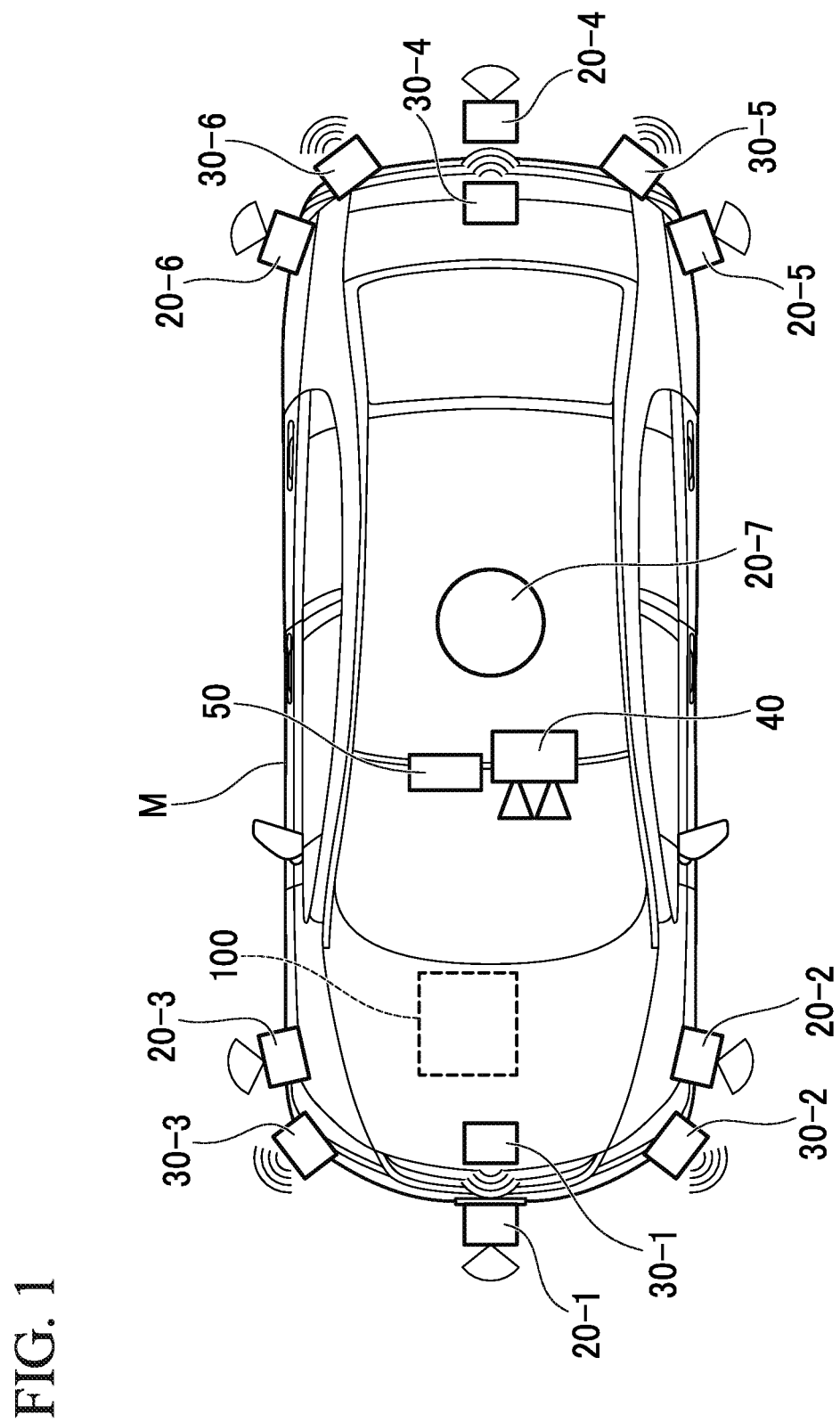
FIG. 1 is a diagram illustrating components provided in a vehicle equipped with a vehicle control apparatus 100 according to a first embodiment.

FIG. 1 is a diagram illustrating components provided in a vehicle (hereinafter referred to as an own vehicle M) equipped with a vehicle control apparatus 100 according to the first embodiment. The vehicle equipped with the vehicle control apparatus 100 is, for example, a vehicle with two wheels, three wheels, four wheels, or the like and includes a vehicle having an internal combustion engine such as a diesel engine or a gasoline engine as a power source, an electric vehicle having an electric motor as a power source, a hybrid vehicle having both an internal combustion engine and an electric motor, etc. Also the above-mentioned electric vehicle is driven using power discharged by, for example, a cell such as a secondary cell, a hydrogen fuel cell, a metal fuel cell, or an alcohol fuel cell.

As illustrated in FIG. 1, sensors such as finders 20-1 to 20-7, radars 30-1 to 30-6, and a camera 40, a navigation apparatus 50, and the above-mentioned vehicle control apparatus 100 are mounted in the own vehicle M. Each of the finders 20-1 to 20-7 is, for example, light detection and ranging or laser imaging detection and ranging (LIDAR) for measuring scattered light in regards to irradiation of light and measuring a distance to a target. For example, the finder 20-1 is attached to a front grille or the like, and the finders 20-2 and 20-3 are attached to a side surface of a vehicle body, a door mirror, an inside of a head lamp, the vicinity of a side marker lamp, or the like. The finder 20-4 is attached to a trunk lid or the like and the finders 20-5 and 20-6 are attached to the side surface of the vehicle body, an inside of a taillight, or the like. The above-mentioned finders 20-1 to 20-6 have, for example, a detection area of about 150 degrees in a horizontal direction. Also, the finder 20-7 is attached to a roof or the like. The finder 20-7 has, for example, a detection area of 360 degrees in the horizontal direction.

Each of the above-mentioned radars 30-1 and 30-4 is, for example, a long-range millimeter wave radar having a wider detection area than other radars in a depth direction. Also, each of the radars 30-2, 30-3, 30-5, and 30-6 is a medium-range millimeter wave radar having a narrower detection area than the radars 30-1 and 30-4 in the depth direction. Hereinafter, the finders 20-1 to 20-7 are simply referred to as a "finder 20" unless otherwise specifically distinguished and the radars 30-1 to 30-6 are simply referred to as "radar 30" unless otherwise specifically distinguished. The radar 30 detects a physical object in, for example, a frequency modulated continuous wave (FM-CW) scheme.

The camera 40 is a digital camera using a solid-state imaging element such as, for example, a charge coupled device (CCD) or a complementary metal oxide semiconductor (CMOS). The camera 40 is attached to an upper portion of a front windshield, a backside of a rearview mirror, or the like. The camera 40; for example, periodically and iteratively images a front part of the own vehicle M.

Also, the configuration illustrated in FIG. 1 is merely an example, some of the components may be omitted, and other components may be further added.

Figure 2:
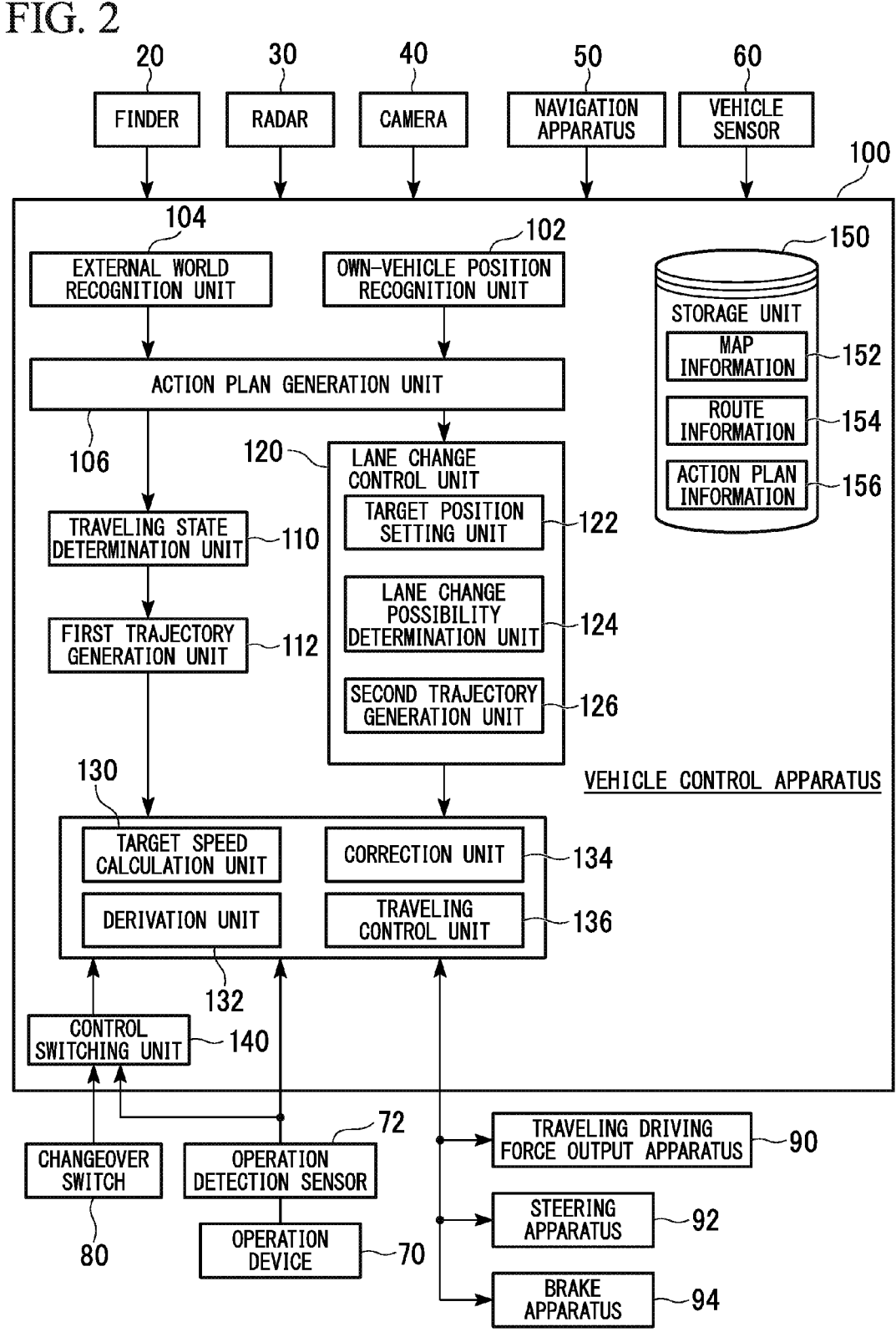
FIG. 2 is a functional configuration diagram of an own vehicle M focusing on the vehicle control apparatus 100 according to the first embodiment.

FIG. 2 is a functional configuration diagram of the own vehicle M focusing on the vehicle control apparatus 100 according to the first embodiment. The own vehicle M is equipped with the navigation apparatus 50, a vehicle sensor 60, an operation device 70, an operation detection sensor 72, a changeover switch 80, a traveling driving force output apparatus 90, a steering apparatus 92, a brake apparatus 94, and the vehicle control apparatus 100 in addition to the finder 20, the radar 30, and the camera 40. These apparatuses and devices are mutually connected through a multiplex communication line or a serial communication line such as a controller area network (CAN) communication line or a wireless communication network.

The navigation apparatus 50 has a global navigation satellite system (GNSS) receiver or map information (a navigation map), a touch panel type display apparatus which functions as a user interface, a speaker, a microphone, etc. The navigation apparatus 50 specifies a position of the own vehicle M using the GNSS receiver and derives a route from the position to a destination designated by a user. The route derived by the navigation apparatus 50 is stored in a storage unit 150 as route information 154. The position of the own vehicle M may be specified or complemented by an inertial navigation system (INS) using an output of the vehicle sensor 60. Also, the navigation apparatus 50 performs guidance by a sound or navigation display in regards to a route up to a destination when the vehicle control apparatus 100 executes a manual drive mode. Also, a configuration for specifying the position of the own vehicle M may be provided independently of the navigation apparatus 50. Also, the navigation apparatus 50 may be implemented by a function of a terminal apparatus such as, for example, a function of a smartphone possessed by the user or a terminal apparatus such as a tablet terminal. In this case, transmission/reception of information is performed wirelessly or through communication between the terminal apparatus and the vehicle control apparatus 100. Also, the configuration for specifying the position of the own vehicle M may be provided independently of the navigation apparatus 50.

The vehicle sensor 60 includes a vehicle speed sensor which detects vehicle speed, an acceleration sensor which detects acceleration, a yaw rate sensor which detects angular speed around a vertical axis, an azimuth sensor which detects a direction of the own vehicle M, or the like.

The traveling driving force output apparatus 90 includes, for example, an engine and an engine electronic control unit (ECU) which controls the engine if the own vehicle M is a vehicle having an internal combustion engine as a power source, includes a traveling motor and a motor ECU which controls the raveling motor if the own vehicle M is an electric vehicle having an electric motor as a power source, and includes an engine, an engine ECU, a traveling motor, and a motor ECU if the own vehicle M is a hybrid vehicle. If the traveling driving force output apparatus 90 includes only an engine, an engine ECU adjusts a degree of opening, of a throttle of the engine, a shift stage, or the like according to information input from a traveling control unit 136, which will be described below, and outputs a traveling driving force (torque) for the vehicle to travel. Also, if the traveling driving force output apparatus 90 includes only a traveling motor, a motor ECU adjusts a duty ratio of a pulse width modulation (PWM) signal assigned to the traveling motor according to information input from the traveling control unit 136 and outputs the above-mentioned traveling driving force. Also, if the traveling driving force output apparatus 90 includes an engine and a traveling motor, both an engine ECU and a motor ECU control the traveling driving force in cooperation with each other according to information input from the traveling control unit 136.

The steering apparatus 92 includes, for example, an electric motor, a steering torque sensor, a steering angle sensor, etc. The electric motor changes, for example, a direction of a steering wheel by causing a force to act on a rack and pinion function or the like. The steering torque sensor detects, for example, torsion of a torsion bar when the steering wheel is operated as steering torque (a steering force). The steering angle sensor detects, for example, a steering angle (or an actual steering angle). The steering apparatus 92 causes the electric motor to drive according to the information input from the traveling control unit 136 and changes the direction of the steering wheel.

The brake apparatus 94 includes a master cylinder which transmits a brake operation performed on a brake pedal as an oil pressure, a reservoir tank which stores brake fluid, a brake actuator which adjusts a braking force output to each vehicle wheel, or the like. The brake control unit 44 controls the brake actuator or the like so that brake torque according to a pressure of the master cylinder is output to each vehicle wheel according to information input from the traveling control unit 136. Also, the brake apparatus 94 is not limited to an electronic control type brake apparatus which is operated by the above-described oil pressure, and may be an electronic control type brake apparatus which is operated by an electronic actuator.

The operation device 70 includes, for example, an accelerator pedal, a steering wheel, a brake pedal, a shift lever, etc. The operation detection sensor 72 which detects a presence, absence or amount of operation by a driver is attached to the operation device 70. The operation detection sensor 72 includes, for example, an accelerator opening sensor, a steering torque sensor, a brake sensor, a shift position sensor, etc. The operation detection sensor 72 outputs a degree of accelerator opening, a steering torque, an amount of brake depression, a shifted position, etc. serving as detection results to the traveling control unit 136. Also, in place of this, a detection result of the operation detection sensor 72 may be directly output to the driving force output apparatus 90, the steering apparatus 92, or the brake apparatus 94.

The changeover switch 80 is a switch to be operated by the driver or the like. The changeover switch 80 may be, for example, a mechanical switch installed in the steering wheel, a trim (a dashboard), or the like or may be a graphical user interface (GUI) switch provided in a touch panel of the navigation apparatus 50. The changeover switch 80 receives an operation of the driver or the like, generates a control mode designation signal for designating a control mode by the traveling control unit 136 as one of an automatic drive mode and a manual drive mode, and outputs the control mode designation signal to a control switching unit 140. The automatic drive mode is a drive mode in which a vehicle travels in a state in which a driver does not perform an operation (or an amount of operation is less or an operation frequency is lower than in the manual drive mode) as mentioned above. More specifically, the automatic drive mode is a drive mode in which some or all of the traveling driving force output apparatus 90, the steering apparatus 92, and the brake apparatus 94 are controlled on the basis of an action plan.

[Vehicle Control Apparatus]

Hereinafter, the vehicle control apparatus 100 will be described. The vehicle control apparatus 100 includes, for example, an own-vehicle position recognition unit 102, an external world recognition unit 104, an action plan generation unit 106, a traveling state determination unit 110, a first trajectory generation unit 112, a lane change control unit 120, a target speed calculation unit 130, a derivation unit 132, a correction unit 134, the traveling control unit 136, the control switching unit 140, and the storage unit 150. Some or all of the own-vehicle position recognition unit 102, the external world recognition unit 104, the action plan generation unit 106, the traveling state determination unit 110, the first trajectory generation unit 112, the lane change control unit 120, the target speed calculation unit 130, the derivation unit 132, the correction unit 134, the traveling control unit 136, and the control switching unit 140 are software function units which function by a processor such as a central processing unit (CPU) executing a program. Also, some or all of the units may be hardware function units such as large scale integration (LSI) and an application specific integrated circuit (ASIC). Also, the storage unit 150 is implemented by a read-only memory (ROM), a random access memory (RAM), a hard disk drive (HDD), a flash memory, etc. A program to be executed by the processor may be pre-stored in the storage unit 150 and may be downloaded from an external apparatus via an on-vehicle Internet facility or the like. Also, a portable storage medium storing a program may be mounted in a drive apparatus (not illustrated) and installed in the storage unit 150.

The own-vehicle position recognition unit 102 recognizes a lane along which the own vehicle M travels (a traveling lane) and a relative position of the own vehicle M in regards to the traveling lane on the basis of information input from map information 152 stored in the storage unit 150, the finder 20, the radar 30, the camera 40, the navigation apparatus 50, or the vehicle sensor 60. The map information 152 is, for example, map information having more precision than a navigation map provided in the navigation apparatus 50 and may include information of a center of a lane or information about a boundary of a lane. More specifically, the map information 152 includes road information, traffic control information, address information (an address and a postal code), facility information, telephone number information, etc. The road information includes information indicating a type of road such as a highway, a toll road, a national road, or a prefectural road and information about the number of lanes of the road, a width of each road, a gradient of the road, a position (three-dimensional coordinates including longitude, latitude, and elevation) of the road, a curvature of a curve of a lane, positions of merging and branching points of the lane, a sign provided on the road, etc. The traffic control information includes information indicating that the lane is blocked due to construction, traffic accidents, traffic jams, or the like.

Figure 3:
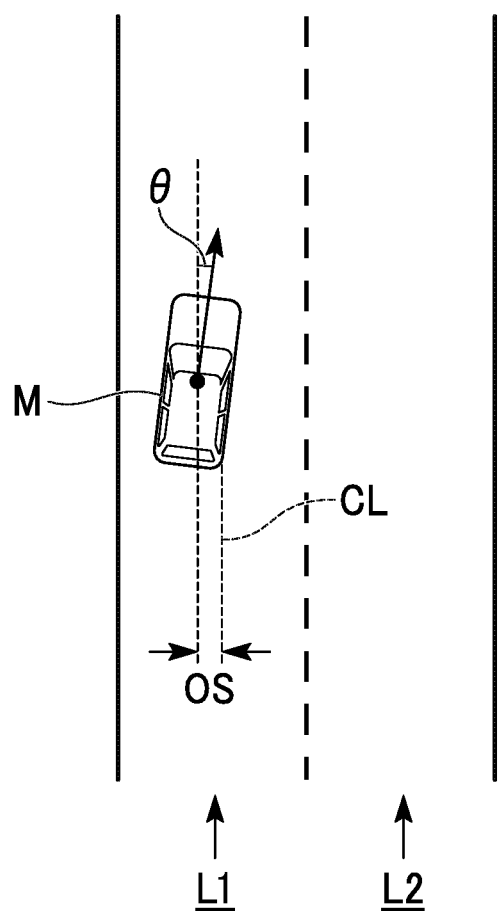
FIG. 3 is a diagram illustrating a state in which an own-vehicle position recognition unit 102 recognizes a relative position of the own vehicle M in regards to a traveling lane L1.

FIG. 3 is a diagram illustrating a state in which the own-vehicle position recognition unit 102 recognizes a relative position of the own vehicle M in regards to a traveling lane L1. The own-vehicle position recognition unit 102 recognizes, for example, a gap OS from a traveling lane center CL of a reference point (for example, a center of gravity) of the own vehicle M and an angle 0 formed with respect to a line lined with the traveling lane center CL of a traveling direction of the own vehicle M as a relative position of the own vehicle M in regards to the traveling lane L1. Also, in place of this, the own-vehicle position recognition unit 102 may recognize a position of a reference point of the own vehicle M or the like for one side end of the own-vehicle lane L1 as the relative position of the own vehicle M in regards to the traveling lane.

The external world recognition unit 104 recognizes a position and states of a speed and acceleration of a peripheral vehicle on the basis of information input from the finder 20, the radar 30, the camera 40, etc. The peripheral vehicle in the present embodiment is a vehicle which travels in the same direction as the own vehicle M and is a vehicle which travels around the own vehicle M. The position of the peripheral vehicle may be indicated by a representative point such as a center of gravity or a corner of the other vehicle or indicated by an area in which an outline of the other vehicle is represented. The "state" of the peripheral vehicle may include whether the peripheral vehicle accelerates or makes a lane change (or whether a lane change is intended) on the basis of information of the above-mentioned various types of devices. Also, the external world recognition unit 104 may recognize positions of other physical objects such as a guardrail, a utility pole, a parked vehicle, and a pedestrian in addition to a peripheral vehicle.

The action plan generation unit 106 generates an action plan in a predetermined section. The predetermined section is, for example, a section in which the vehicle passes through a toll road such as a highway among routes derived by the navigation apparatus 50. Also, the action plan generation unit 106 is not limited thereto, but may generate an action plan for arbitrary section.

The action plan is constituted of, for example, a plurality of events which are sequentially executed. The events include, for example, a deceleration event for causing the own vehicle M to decelerate, an acceleration event for causing the own vehicle M to accelerate, a lane keeping event for causing the own vehicle M to travel without deviating from a traveling lane, a lane change event for changing a traveling lane, a passing event for causing the own vehicle M to pass a front traveling vehicle, a branching event for causing the own vehicle M to change its lane to a desired lane or causing the own vehicle M to travel without deviating from a current traveling lane at a branching point, a merging event for causing the own vehicle M to accelerate or decelerate or make a traveling lane change in a merging lane for joining a main lane, etc. For example, if a junction (a branching point) is on a toll road (for example, a highway or the like), it is necessary for the vehicle control apparatus 100 to change its lane or keep its lane so that the own vehicle M moves in a direction of a destination in the automatic drive mode. Accordingly, when the map information 152 is referred to and it is determined that a junction is on a road, the action plan generation unit 106 sets the lane change event for changing its lane to a desired lane along which the own vehicle M can move in the direction of the destination from a current position (coordinates) of the own vehicle M to a position (coordinates) of the junction. Also, information indicating the action plan generated by the action plan generation unit 106 is stored as action plan information 156 in the storage unit 150.

Figure 4:
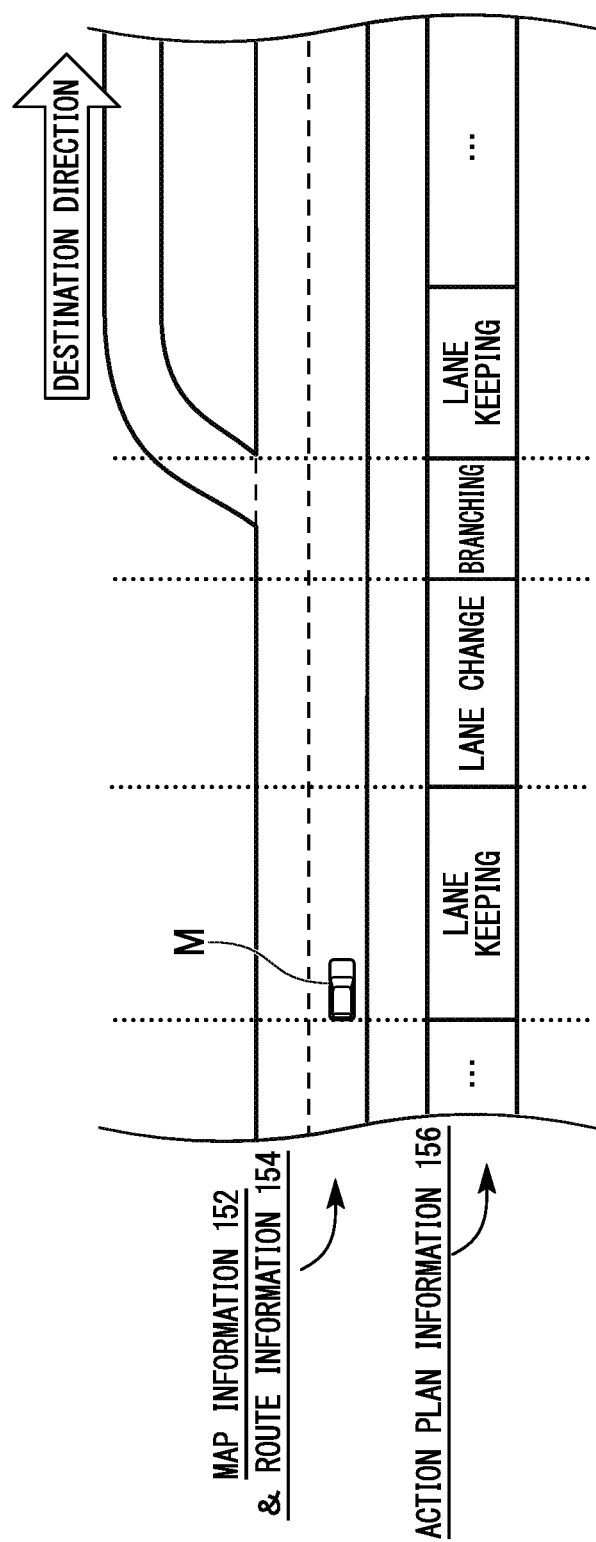
FIG. 4 is a diagram illustrating an example of an action plan generated in a certain section.

FIG. 4 is a diagram illustrating an example of an action plan generated in a certain section. As illustrated, the action plan generation unit 106 classifies a scene occurring in a case in which the own vehicle M has traveled along a route up to a destination and generates an action plan so that an event based on each scene is executed. Also, the action plan generation unit 106 may dynamically change the action plan according to a situation change of the own vehicle M.

The action plan generation unit 106 may change (update), for example, the generated action plan on the basis of a state of an external world recognized by the external world recognition unit 104. Generally, the state of the external world constantly changes while the vehicle travels. In particular, if the own vehicle M travels along a road including a plurality of lanes, a distance interval from another vehicle relatively changes. For example, if a preceding vehicle decelerates by performing abrupt braking or if a vehicle traveling along an adjacent lane cuts in front of the own vehicle M, the own vehicle M needs to travel while appropriately changing its speed or lane according to the action of a preceding vehicle or the action of the vehicle of the adjacent lane. Accordingly, the action plan generation unit 106 may change an event set for each control section according to the above-mentioned state change of the external world.

Specifically, if the speed of another vehicle recognized by the external world recognition unit 104 has exceeded a threshold value while the own vehicle travels or if a movement direction of another vehicle traveling along a lane adjacent to the own-vehicle lane is an own-vehicle lane direction, the action plan generation unit 106 changes an event set in a section in which the own vehicle M is scheduled to travel. For example, if the event is set so that the lane change event is executed after the lane keeping event, the action plan generation unit 106 changes the next event after the lane keeping event from the lane change to the deceleration event, the lane keeping event, or the like when it is determined that the vehicle has traveled at speed greater than or equal to the threshold value from the rear of a lane change destination during the lane keeping event according to a recognition result of the external world recognition unit 104. Thereby, the vehicle control apparatus 100 avoids a collision of the own vehicle M with a vehicle of the lane change destination. As a result, the vehicle control apparatus 100 can cause the own vehicle M to automatically travel safely even if the state of the external world has changed.

[Lane Keeping Event]

When the lane keeping event included in the action plan is executed by the traveling control unit 136, the traveling state determination unit 110 determines a traveling state of one of constant speed traveling, follow-up traveling, deceleration traveling, cornering traveling, obstacle avoidance traveling, etc. For example, if no other vehicle travels in front of the own vehicle, the traveling state determination unit 110 determines the traveling state as the constant speed traveling. Also, if the own vehicle performs the follow-up traveling in regards to a front traveling vehicle, the traveling state determination unit 110 determines the traveling state as the follow-up traveling. Also, if the external world recognition unit 104 recognizes a deceleration of a front traveling vehicle or if an event such as stopping or parking is executed, the traveling state determination unit 110 determines the traveling state as the deceleration traveling. Also, if the external world recognition unit 104 has recognized that the own vehicle M is approaching a curved road, the traveling state determination unit 110 determines the traveling state as the cornering traveling. Also, if the external world recognition unit 104 has recognized that an obstacle is in front of the own vehicle M, the traveling state determination unit 110 determines the traveling state as the obstacle avoidance traveling.

The first trajectory generation unit 112 generates a trajectory on the basis of the traveling state determined by the traveling state determination unit 110. The trajectory is a set (a locus) of points at which a future target position at which it is assumed that the own vehicle M will arrive is sampled for every predetermined time if the own vehicle M travels on the basis of the traveling state determined by the traveling state determination unit 110.

Figure 5:
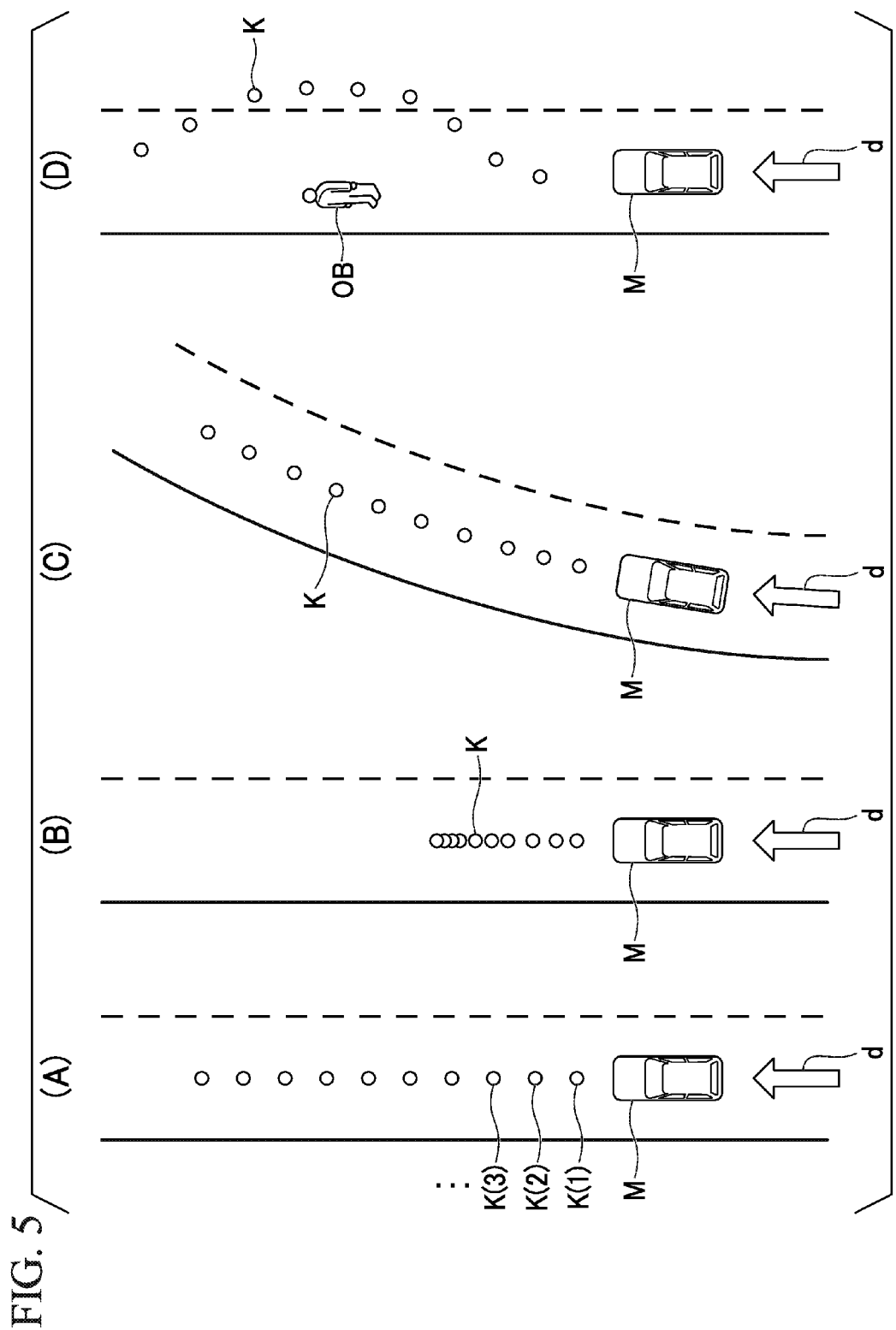
FIG. 5 is a diagram illustrating an example of a trajectory generated by a first trajectory generation unit 112.

FIG. 5 is a diagram illustrating an example of a trajectory generated by the first trajectory generation unit 112. As illustrated in (A) of FIG. 5, for example, the first trajectory generation unit 112 sets future target positions such as K(1), K(2), K(3), . . . as a trajectory of the own vehicle M every time a predetermined time Δt elapses from a current time on the basis of a current position of the own vehicle M. Hereinafter, these target positions are merely referred to as a "target position K" unless otherwise distinguished. For example, the number of target positions K is determined according to a target time T. For example, the first trajectory generation unit 112 sets the target position K on a center line of a traveling lane at an interval of the predetermined time Δt (for example, 0.1 sec) for 5 sec if the target time T is set to 5 sec, and determines arrangement intervals of a plurality of target positions K on the basis of the traveling state. The first trajectory generation unit 112 may derive, for example, the center line of the traveling lane from information such as a width of the lane included in the map information 152 and may acquire the center line of the traveling lane from the map information 152 if the center line of the traveling lane is previously included in the map information 152.

For example, if the above-mentioned traveling state determination unit 110 determines the traveling state as the constant speed traveling, the first trajectory generation unit 112 generates a trajectory by setting the plurality of target positions K at regular intervals as illustrated in (A) of FIG. 5. Also, if the traveling state determination unit 110 determines the traveling state as the deceleration traveling (a case in which a preceding vehicle has decelerated in the follow-up traveling is also included), the first trajectory generation unit 112 generates the trajectory by further widening an interval when an arrival time is earlier for the target position K and further narrowing the interval when the arrival time is later for the target position K as illustrated in (B) of FIG. 5. Thereby, the traveling control unit 136, which will be described below, causes the own vehicle M to decelerate because the target position K at which an arrival time from the own vehicle M is late is close to the current position of the own vehicle M.

Also, as illustrated in (C) of FIG. 5, the traveling state determination unit 110 determines the traveling state as the cornering traveling when a road is a curved road. In this case, the first trajectory generation unit 112 generates a trajectory by arranging the plurality of target positions K while changing a horizontal position in a traveling direction of the own vehicle M (a position of a lane width direction), for example, according to a curvature of the road. Also, as illustrated in (D) of FIG. 5, if an obstacle OB such as a human or a stopped vehicle is on a road in front of the own vehicle M, the traveling state determination unit 110 determines the traveling state as the obstacle avoidance traveling. In this case, the first trajectory generation unit 112 generates a trajectory by arranging the plurality of target positions K so that the own vehicle M travels while avoiding the obstacle OB.

[Lane Change Event]

The lane change control unit 120 performs control when the traveling control unit 136 executes the lane change event included in the action plan. The lane change control unit 120 includes, for example, a target position setting unit 122, a lane change possibility determination unit 124, and a second trajectory generation unit 126. Also, the lane change control unit 120 may perform the following process when the traveling control unit 136 performs the branching event or the merging event.

The target position setting unit 122 specifies a vehicle which travels along a lane adjacent to a lane (an own-vehicle lane) along which the own vehicle M travels and which travels in front of the own vehicle M and a vehicle which travels along the adjacent lane and which travels behind the own vehicle M and sets a target area TA between the vehicles. Hereinafter, the vehicle which travels along the adjacent lane and which travels in front of the own vehicle M will be described by being referred to as a front reference vehicle and the vehicle which travels along the adjacent lane and which travels behind the own vehicle M will be described by being referred to as a rear reference vehicle. Also the target position setting unit 122 may set the target area TA behind a rear reference vehicle mC (between the rear reference vehicle mC and a vehicle located behind the rear reference vehicle mC) on an adjacent lane L2.

If a predetermined setting condition that no peripheral vehicle is in the target area TA set by the target position setting unit 122 and both a virtual time-to collision (TTC) between the own vehicle M and the front reference vehicle and a virtual TTC between the own vehicle M and the rear reference vehicle are greater than a threshold value is satisfied, the lane change possibility determination unit 124 determines that the own vehicle M can change its lane into the target area TA set on the adjacent lane. The TTC is derived by, for example, assuming that the own vehicle M has changed the lane to the target area TA and dividing an inter-vehicle distance between the virtual own vehicle M in the target area TA and the front reference vehicle (or the rear reference vehicle) by the speed of the own vehicle M and a relative speed of the front reference vehicle (or the rear reference vehicle).

Figure 6:
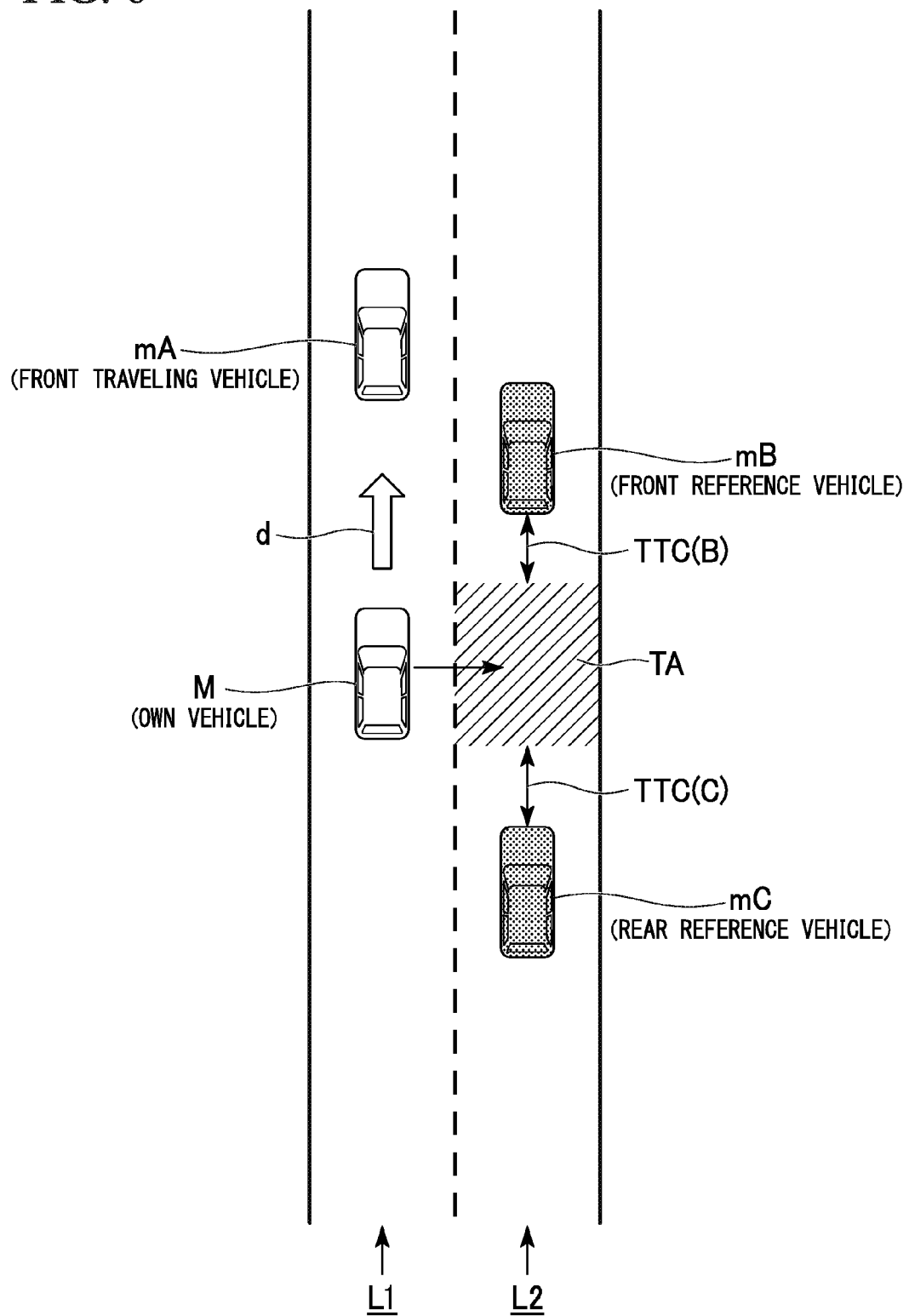
FIG. 6 is a diagram illustrating a state in which a target position setting unit 122 sets a target area TA in the first embodiment.

FIG. 6 is a diagram illustrating a state in which the target position setting unit 122 sets the target area TA in the first embodiment. In FIG. 6, mA denotes a front traveling vehicle, mB denotes a front reference vehicle, and mC denotes a rear reference vehicle. Also, an arrow d denotes a traveling direction of the own vehicle, L1 denotes an own-vehicle lane, and L2 denotes an adjacent lane.

In the case of the example of FIG. 6, the target position setting unit 122 sets the target area TA between a front reference vehicle mB and the rear reference vehicle mC on the adjacent lane L2. In this case, the lane change possibility determination unit 124 virtually arranges the own vehicle M in the target area TA set by the target position setting unit 122 and derives a TTC (B) for the front reference vehicle mB and a TTC (C) for the rear reference vehicle mC on the basis of the virtual own vehicle M. The lane change possibility determination unit 124 determines whether both of the two derived TTCs satisfy a predetermined setting condition and determines that the own vehicle M can change its lane into the target area TA set on the adjacent lane L2 if both the TTCs satisfy the predetermined setting condition (for example, if the TTCs are greater than or equal to threshold values set in a front direction and a rear direction).

Also, the lane change possibility determination unit 124 may determine whether the own vehicle M can change its lane into the target area TA in consideration of speeds, accelerations, or jerks of a front traveling vehicle mA, the front reference vehicle mB, and the rear reference vehicle mC. For example, if the speeds of the front reference vehicle mB and the rear reference vehicle mC are greater than the speed of the front traveling vehicle mA and the front reference vehicle mB and the rear reference vehicle mC are expected to pass the front traveling vehicle mA within a range of time required for the own vehicle M to change the lanes, the lane change possibility determination unit 124 determines that the own vehicle M cannot change its lane into the target area TA set between the front reference vehicle mB and the rear reference vehicle mC.

If the above-mentioned lane change possibility determination unit 124 has determined that the own vehicle M can change its lane into the target area TA, the second trajectory generation unit 126 generates a trajectory for changing the lane into the target area TA.

Figure 7:
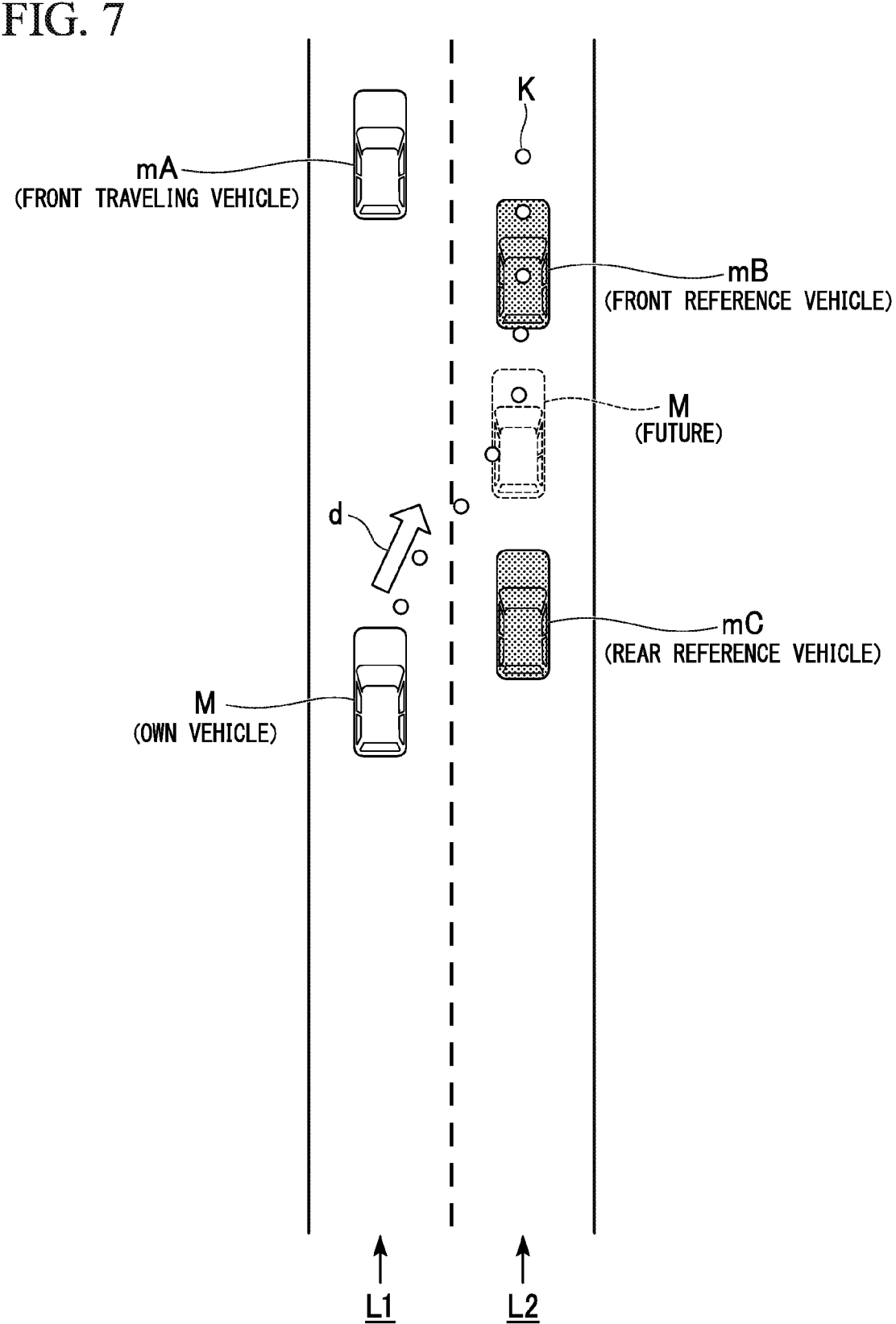
FIG. 7 is a diagram illustrating a state in which a second trajectory generation unit 126 generates a trajectory in the first embodiment.
Figure 8:
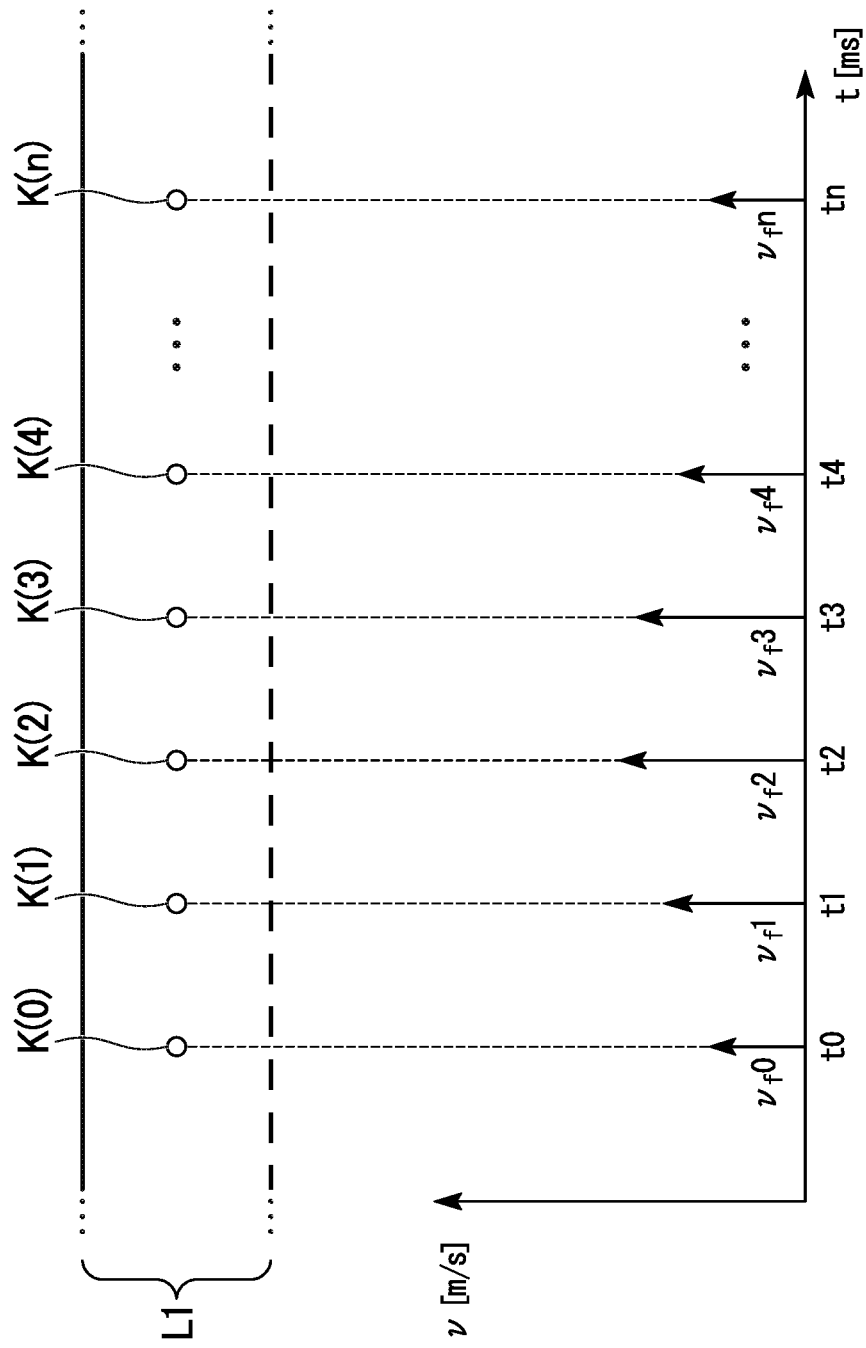
FIG. 8 is a diagram illustrating an example of a primary target speed $v_f$ set for each target position K on a trajectory generated by the first trajectory generation unit 112 or the second trajectory generation unit 126.

FIG. 7 is a diagram illustrating a state in which the second trajectory generation unit 126 generates a trajectory in the first embodiment. For example, the second trajectory generation unit 126 assumes that the front reference vehicle mB and the rear reference vehicle mC travel in predetermined speed models and generates a trajectory so that the own vehicle M is between the front reference vehicle mB and the rear reference vehicle mC at a certain time in the future on the basis of speed models of the three vehicles and a speed of the own vehicle M. For example, the second trajectory generation unit 126 smoothly connects positions from a current position of the own vehicle M to a position of the front reference vehicle mB at a certain time in the future using a polynomial curve such as a spline curve, and arranges a predetermined number of target positions K at regular intervals or irregular intervals on the curve. At this time, the second trajectory generation unit 126 generates a trajectory so that at least one of the target positions K is arranged in the target area TA FIG. 8 is a diagram illustrating an example of a primary target speed $v_f$ set for each target position K on the trajectory generated by the first trajectory generation unit 112 or the second trajectory generation unit 126. As illustrated, the primary target speed $v_f$ is automatically determined on the basis of each target position K on the trajectory, an arrangement interval (the predetermined time $\Delta t$), and a target time T. For example, the primary target speed $v_f$ is determined for each target position K so that a primary target speed $v_f 0$ is set at a target position K(0), a primary target speed $v_f 1$ is set at the target position K(1), and a primary target speed $v_f 2$ is set at the target position K(2). This primary target speed $v_f$ is used in a process of the target speed calculation unit 130, which will be described below.

The target speed calculation unit 130 calculates a secondary target speed $v_s$ of the own vehicle M on the basis of the primary target speed $v_f$ set for each target position of the trajectory generated by the first trajectory generation unit 112 or the second trajectory generation unit 126.

FIG. 9 is a diagram illustrating a process of calculating the secondary target speed $v_s$ using the target speed calculation unit 130 in the first embodiment. The target speed calculation unit 130 calculates an average value of a primary target speed $v_f i$ set at a certain target position K(i) and a primary target speed $v_f i+1$ set at a scheduled target position K(i+1) at which the own vehicle M will arrive after the target position K(i), and sets the calculated average value as the secondary target speed $v_s i$ of the own vehicle M from the target position K(i) to the target position K(i+1). Here, i denotes an internal parameter when a processor performs a process on the basis of a program. Thereby, the target speed calculation unit 130 can advance a time phase of the secondary target speed $v_s$ by ½ of an interval of the predetermined time $\Delta t$.

In the illustrated example, the target speed calculation unit 130 calculates an average value $(v_f 0 + v_f 1)/2$ between the primary target speed $v_f 0$ of the target position K(0) and the primary target speed $v_f 1$ of the target position K(1), and sets the average value $(v_f 0 + v_f 1)/2$ as a secondary target speed $v_s 0$ of the target position K(0). Likewise, the target speed calculation unit 130 calculates an average value $(v_f 1 + v_f 2)/2$ between the primary target speed $v_f 1$ of the target position K(1) and the primary target speed $v_f 2$ of the target position K(2), and sets the average value $(v_f 1 + v_f 2)/2$ as a secondary target speed $v_s 1$ of the target position K(1).

Thus, the target speed calculation unit 130 sets the secondary target speed $v_s$ obtained by advancing a time phase with respect to the primary target speed $v_f$ for each target position K of the trajectory. As described above, the setting of the secondary target speed $v_s$ is obtained in consideration of the fact that a rise in acceleration is delayed due to a control instruction in regards to an inertial force of the own vehicle M, responsiveness of the engine, or an ambient environment such as a gradient of a road surface on which the own vehicle M travels or wind at a time of traveling.

Also, in addition to the setting an average value of the primary target speeds $v_f$ of two adjacent target positions K as the secondary target speed $v_s$, the target speed calculation unit 130 may obtain, for example, an average value of the primary target speeds $v_f$ of q target positions K(i) to K(i+q) serving as targets, wherein q is a predetermined number, and set the average value as the secondary target speed $v_s$. Also, the target speed calculation unit 130 may weigh the primary target speeds $v_f$ and set an average value (a weighted average value) of the weighted primary target speeds $v_f$ to the secondary target speed $v_s$. Also, the target speed calculation unit 130 may set the primary target speed $v_f$ to the secondary target speed $v_s$ as it is.

However, a possibility of accurate arrival at a desired position is reduced by advancing the time phase. Also, even if the primary target speed $v_f$ is set as the secondary target speed $v_s$ as it is without advancing the time phase, the possibility of accurate arrival at the desired position is of course not sufficiently increased due to the inertial force of the own vehicle M, the responsiveness of the engine, or the like.

Therefore, in the present embodiment, the derivation unit 132 and the correction unit 134 perform the following process, thereby moving the vehicle to a desired position at a desired timing.

The derivation unit 132 derives a difference between the target position K of the trajectory generated by the first trajectory generation unit 112 or the second trajectory generation unit 126 and the current position P of the own vehicle M every time the predetermined time Δt elapses.

The correction unit 134 corrects the secondary target speed $v_s$ calculated by the target speed calculation unit 130 on the basis of the difference derived by the derivation unit 132. Hereinafter, the secondary target speed $v_s$ corrected by the correction unit 134 will be described by being referred to as a final target speed v#.

Figure 10:
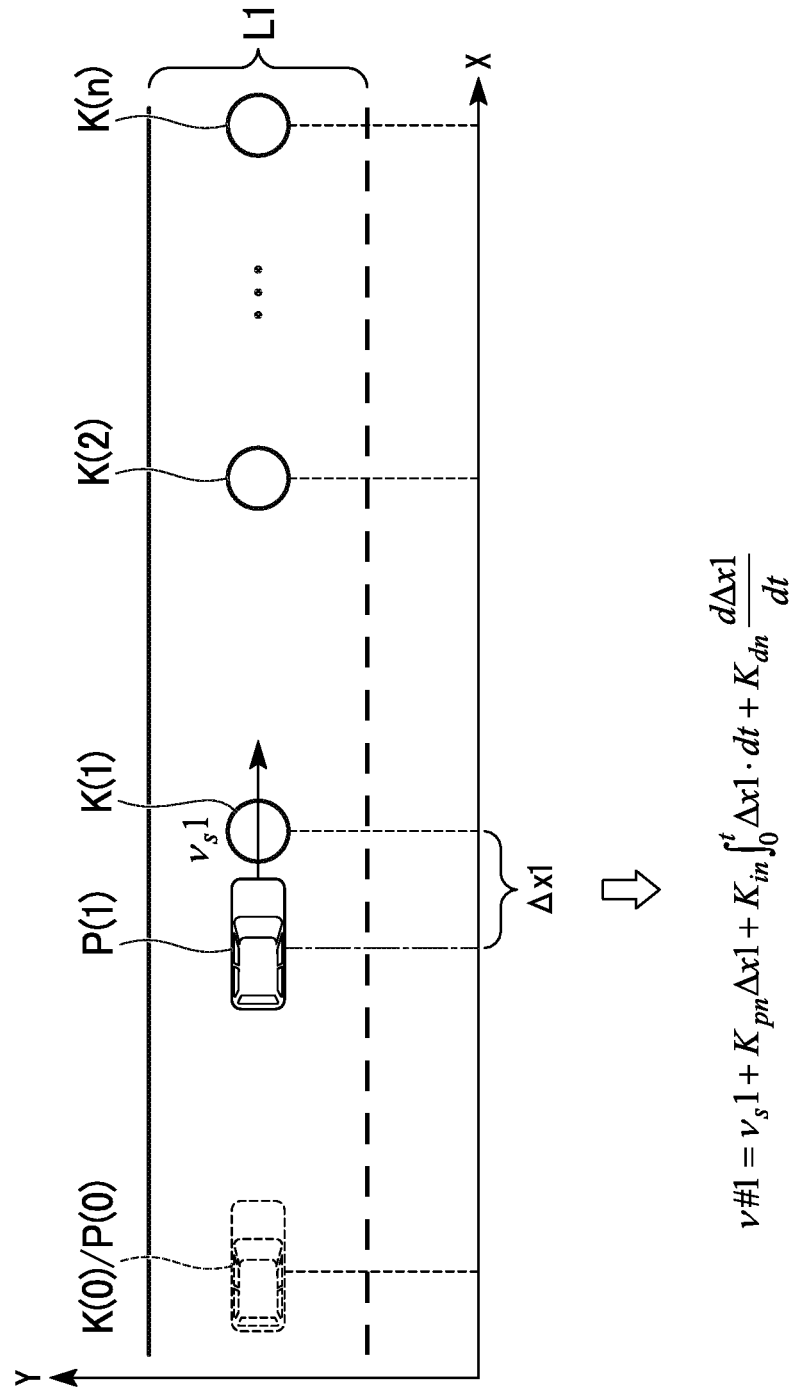
FIG. 10 is a diagram illustrating a state in which a derivation unit 132 derives a difference between the target position K and a current position P of the own vehicle M in the first embodiment.

Hereinafter, processes of the derivation unit 132 and the correction unit 134 will be described. FIG. 10 is a diagram illustrating a state in which the derivation unit 132 derives a difference between the target position K and the current position P of the own vehicle M in the first embodiment. In FIG. 10, a horizontal axis X represents a vehicle traveling direction of a position of the own vehicle M and a vertical axis Y represents a direction perpendicular to the vehicle traveling direction, that is, a lane width direction. In the description of FIG. 10, a position of the lane width direction will be described as being fixed without displacement. That is, a target position for every predetermined time Δt is indicated by displacements K(0), K(1), K(2), . . . along the X-axis and the position of the own vehicle M is similarly indicated by P(0), P(1), P(2), . . . along the X-axis without considering the position of the lane width direction. Also, the own vehicle M will be described as being located at the target position K(0) at a current time in FIG. 10 (K(0) and P(0) match).

At each of the target positions K(1) to K(n) included in the trajectory, a vehicle traveling direction component X are which the own vehicle M should be located at each time is defined, and the derivation unit 132 derives a difference between a current position P(i) of the own vehicle M, which will be moved every time the predetermined time Δt elapses, and its target position K(i).

At a time ti (i=1, 2, 3, . . . ), the derivation unit 132 derives a difference Δxi between the target position P(i) and the current position K(i) of the own vehicle M at the actual time ti.

The correction unit 134 designates the difference Δxi as deviation and corrects the secondary target speed $v_s$ with reference to the following Equation (1) based on, for example, a proportional-integral-derivative (PID) controller to generate a final target speed v#i at the time ti. In Equation (1), $K_{pn}$ denotes a proportional gain, $K_{in}$ denotes an integral gain, and $K_{dn}$ denotes a derivative gain, and these parameters are used when the final target speed v#i is generated using the difference Δxi between the target position P(i) and the current position K(i) of the own vehicle M. Also, Equation (1) is an example and may be appropriately changed.

[Math. 1]

$$v\#i = v_s i + K_{pn} \Delta xi + K_{in} \int_0^t \Delta xi \cdot dt + K_{dn} \frac{d\Delta xi}{dt} \quad (1)$$

In the example of FIG. 10, the own vehicle M is delayed because the own vehicle M is at the current position P(1) and is located in front of the target position K(1) at a time t1.

In this case, the correction unit 134 performs correction for increasing the final target speed v#i more than the secondary target speed $v_s$ so that speed is recovered by an amount of delay on the basis of the above-mentioned Equation (1).

Also, the correction unit 134 may determine the final target speed v#i by correcting the secondary target speed $v_s i$ so that the own vehicle M travels a distance (K(n)−K(i)+Δxi), which is obtained by adding the difference Δxi to a distance (K(n)−K(i)) from the target position K(i) at which the own vehicle M should be located at the time ti to a target position K(n) at which the own vehicle M should be located at a final time tn, for a time of (T−Δt·i).

Figure 11:
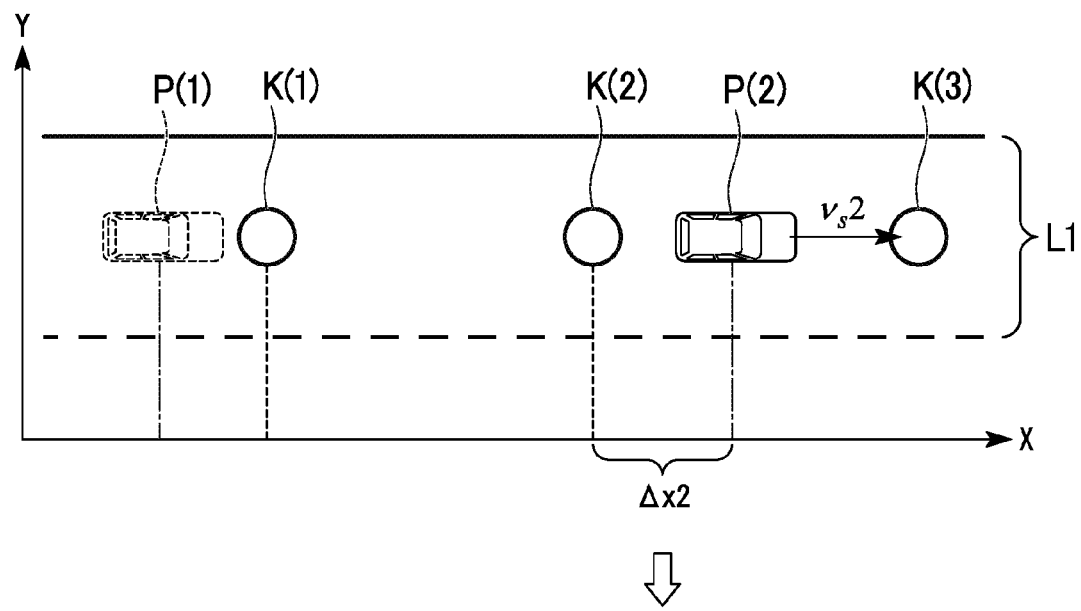
FIG. 11 is a diagram illustrating a state in which the own vehicle M in a situation of FIG. 10 has further traveled for a predetermined time Δt.

FIG. 11 is a diagram illustrating a state in which the own vehicle M in the above-mentioned situation of FIG. 10 has further traveled for the predetermined time Δt. In the illustrated example, a situation in which the own vehicle M travels at a final target speed v#1 generated by the correction unit 134 to pass through the target position K(2) of the next time t2 is shown. The derivation unit 132 derives a difference Δx2 between the current position P(2) of the own vehicle M at the time t2 and the target position K(2). More specifically, the derivation unit 132 derives the difference Δx2 by subtracting the target position K(2) from the current position P(2) of the own vehicle M. That is, the difference Δx2 becomes a negative value.

For example, the correction unit 134 generates a final target speed v#2 by correcting a secondary target speed $v_s 2$ on the basis of the above-mentioned Equation (1). Thereby, the vehicle control apparatus 100 can cause the own vehicle M to travel at a speed lower than a scheduled speed in a phase of time t2.

[Travel Control]

The traveling control unit 136 sets the control mode to the automatic drive mode or the manual drive mode according to control by the control switching unit 140 and controls a control target including some or all of the traveling driving force output apparatus 90, the steering apparatus 92, and the brake apparatus 94 according to the set control mode. The traveling control unit 136 reads the action plan information 156 generated by the action plan generation unit 106 during the automatic drive mode and controls the control target on the basis of an event included in the read action plan information 156.

For example, the traveling control unit 136 determines an amount of control of the electric motor in the steering apparatus 92 (for example, the number of revolutions) and an amount of control of the ECU in the traveling driving force output apparatus 90 (for example, a degree of opening of a throttle of the engine, a shift stage, or the like) according to the trajectory generated by the first trajectory generation unit 112 or the second trajectory generation unit 126. Specifically, the traveling control unit 136 determines the amount of control of the ECU in the traveling driving force output apparatus 90 according to the final target speed v# for each predetermined time Δt calculated from the target position K of the trajectory. Also, the traveling control unit 136 determines the amount of control of the electric motor in the steering apparatus 92 according to an angle formed by a traveling direction of the own vehicle M for each target position K and a direction of a subsequent target position based on the target position.

The traveling control unit 136 outputs information indicating the amount of control to a corresponding control target. Thereby, each of the apparatuses 90, 92, and 94 of control targets can control its own apparatus according to the information indicating the amount of control input from the traveling control unit 136. Also, the traveling control unit 136 appropriately adjusts the determined amount of control on the basis of a detection result of the vehicle sensor 60.

Also, the traveling control unit 136 controls the control target on the basis of an operation detection signal output by the operation detection sensor 72 during the manual drive mode. For example, the traveling control unit 136 outputs the operation detection signal output by the operation detection sensor 72 to each apparatus of the control target as it is.

The control switching unit 140 switches the control mode of the own vehicle M by the traveling control unit 136 from the automatic drive mode to the manual drive mode or from the manual drive mode to the automatic drive mode on the basis of the action plan information 156 generated by the action plan generation unit 106 and stored in the storage unit 150. Also, the control switching unit 140 switches the control mode of the own vehicle M by the traveling control unit 136 from the automatic drive mode to the manual drive mode or from the manual drive mode to the automatic drive mode on the basis of a control mode designation signal input from the changeover switch 80. That is, the control mode of the traveling control unit 136 can arbitrarily change during traveling or during stop according to an operation of the driver or the like.

Also, the control switching unit 140 switches the control mode of the own vehicle M by the traveling control unit 136 from the automatic drive mode to the manual drive mode on the basis of the operation detection signal input from the operation detection sensor 72. For example, if an amount of operation included in the operation detection signal exceeds a threshold value, i.e., if the operation device 70 has received an operation in an amount of operation exceeding the threshold value, the control switching unit 140 switches the control mode of the traveling control unit 136 from the automatic drive mode to the manual drive mode. For example, if the traveling control unit 136 set to the automatic drive mode causes the own vehicle M to automatically travel, the control switching unit 140 switches the control mode of the traveling control unit 136 from the automatic drive mode to the manual drive mode if the driver operates the steering wheel, the accelerator pedal, or the brake pedal by an amount of operation exceeding the threshold value. Thereby, the vehicle control apparatus 100 can immediately switch the mode to the manual drive mode without any operation of the changeover switch 80 according to an instant operation performed by the driver when a physical object such as a human rushes out onto a roadway or a front traveling vehicle abruptly stops. As a result, the vehicle control apparatus 100 can cope with an emergency operation by the driver and improve safety during traveling.

Figure 12:
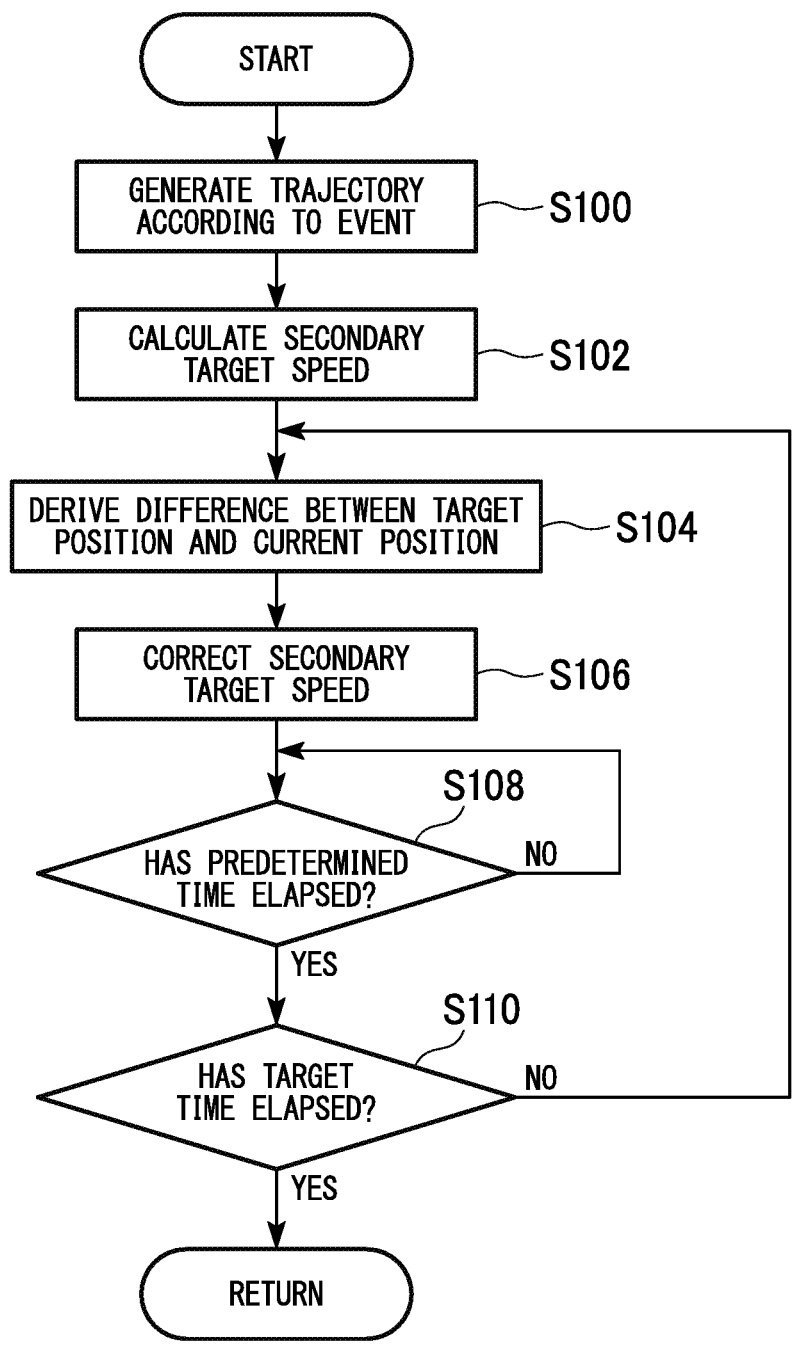
FIG. 12 is a flowchart illustrating an example of a flow of a process of the vehicle control apparatus 100 in the first embodiment.

Here, a specific process of the vehicle control apparatus 100 will be described with reference to a flowchart. FIG. 12 is a flowchart illustrating an example of a flow of a process of the vehicle control apparatus 100 in the first embodiment. The process of the flowchart is performed, for example, in a state in which the action plan generation unit 106 has generated an action plan, and is iteratively performed in a predetermined cycle.

First, the first trajectory generation unit 112 or the second trajectory generation unit 126 generates a trajectory according to an event performed by the traveling control unit 136 (step S100). Next, the target speed calculation unit 130 calculates the secondary target speed $v_s$ of the own vehicle M on the basis of the primary target speed $v_f$ set at each target position K of the trajectory generated by the first trajectory generation unit 112 or the second trajectory generation unit 126 (step S102).

Next, the derivation unit 132 derives a difference Δx between the target position K of the trajectory generated by the first trajectory generation unit 112 or the second trajectory generation unit 126 and the current position P of the own vehicle M (step S104). Next, the correction unit 134 generates the final target speed v# by correcting the secondary target speed $v_s$ calculated by the target speed calculation unit 130 on the basis of the difference Δx derived by the derivation unit 132 (step S106). Thereby, the vehicle control apparatus 100 can correct a positional shift in regards to the target position k caused by a speed error or the like when the own vehicle M actually travels.

Next, a functional unit (for example, the derivation unit 132) of the vehicle control apparatus 100 determines whether the target time T has elapsed (step S110) when the predetermined time Δt has elapsed (step S108; Yes). If the target time T has not elapsed, i.e., if the own vehicle M has not reached the final target position K(n) of the trajectory, the vehicle control apparatus 100 returns to the above-mentioned step S104 and derives a difference between the target position K and the current position P to iterate a process of correcting the secondary target speed $v_s$ corresponding to a subsequent time. On the other hand, if the target time T has elapsed, i.e., if the own vehicle M has reached the final target position K(n) of the trajectory, the vehicle control apparatus 100 ends the process of the flowchart.

Also, although a process of re-calculating the secondary target speed $v_s$ is not illustrated in FIG. 12, the vehicle control apparatus 100 may re-calculate the secondary target speed $v_s$, for example, at a point in time at which a specific event has ended or by executing a process of determining the final target speed v# by correcting the secondary target speed $v_s$ a predetermined number of times when a predetermined time elapses.

Also, the vehicle control apparatus 100 may correct the secondary target speed $v_s$ if the lane change event is executed and does not need to correct the secondary target speed $v_s$ when an event other than the lane change event is executed. Thus, the vehicle control apparatus 100 may correct the secondary target speed $v_s$ if a specific event is executed and does not need to correct the secondary target speed $v_s$ when an event other than the specific event is executed.

According to the above-described first embodiment, the vehicle control apparatus 100 includes the first trajectory generation unit 112 and the second trajectory generation unit 126 configured to generate a locus of a position of the own vehicle M for each predetermined time $\Delta t$ in the future as a trajectory of the own vehicle; the target speed calculation unit 130 configured to calculate the secondary target speed $v_s$ of the own vehicle M for each target position K on the trajectory generated by each of the trajectory generation units; the traveling control unit 136 configured to control traveling of the own vehicle M on the basis of the secondary target speed $v_s$; the derivation unit 132 configured to derive a difference between the target position K on the trajectory generated by one of the above-mentioned trajectory generation units and the current position P of the own vehicle M every time the predetermined time $\Delta t$ elapses; and the correction unit 134 configured to correct the secondary target speed $v_s$ on the basis of the difference derived by the derivation unit 132, thereby moving the vehicle to a desired position at a predetermined timing. As this result, the vehicle control apparatus 100 can prevent the own vehicle M from reaching a position of a lane change before (or after) a schedule determined at a time of trajectory generation, particularly when the lane is changed, and can appropriately keep a distance from a peripheral vehicle. Also, even in other scenes, it is likewise possible to more correctly control the vehicle.

Second Embodiment

Hereinafter, the second embodiment will be described. The vehicle control apparatus 100 in the second embodiment is different from that in the first embodiment in that the secondary target speed $v_s$ is corrected on the basis of an amount of shift (hereinafter, a predicted difference) when a predicted arrival position of the own vehicle M when the own vehicle M travels at the secondary target speed $v_s$ is shifted before/after the target position K. Hereinafter, the related difference will be mainly described.

The derivation unit 132 in the second embodiment derives a predicted difference between a predicted arrival position Q of the own vehicle M and the target position K on a trajectory generated by the first trajectory generation unit 112 or the second trajectory generation unit 126 predicted to be generated after the passage of the predetermined time $\Delta t$ when the own vehicle M travels on the basis of the secondary target speed $v_s$ calculated by the target speed calculation unit 130 in addition to the difference between the target position K on the trajectory generated by the first trajectory generation unit 112 or the second trajectory generation unit 126 and the current position P of the own vehicle M. The predicted arrival position Q is a position at which the own vehicle M is predicted to arrive from the target position K(i) serving as a target if the own vehicle M travels for the predetermined time $\Delta t$ according to the secondary target speed $v_s$i corresponding to the target position K(i).

Figure 13:
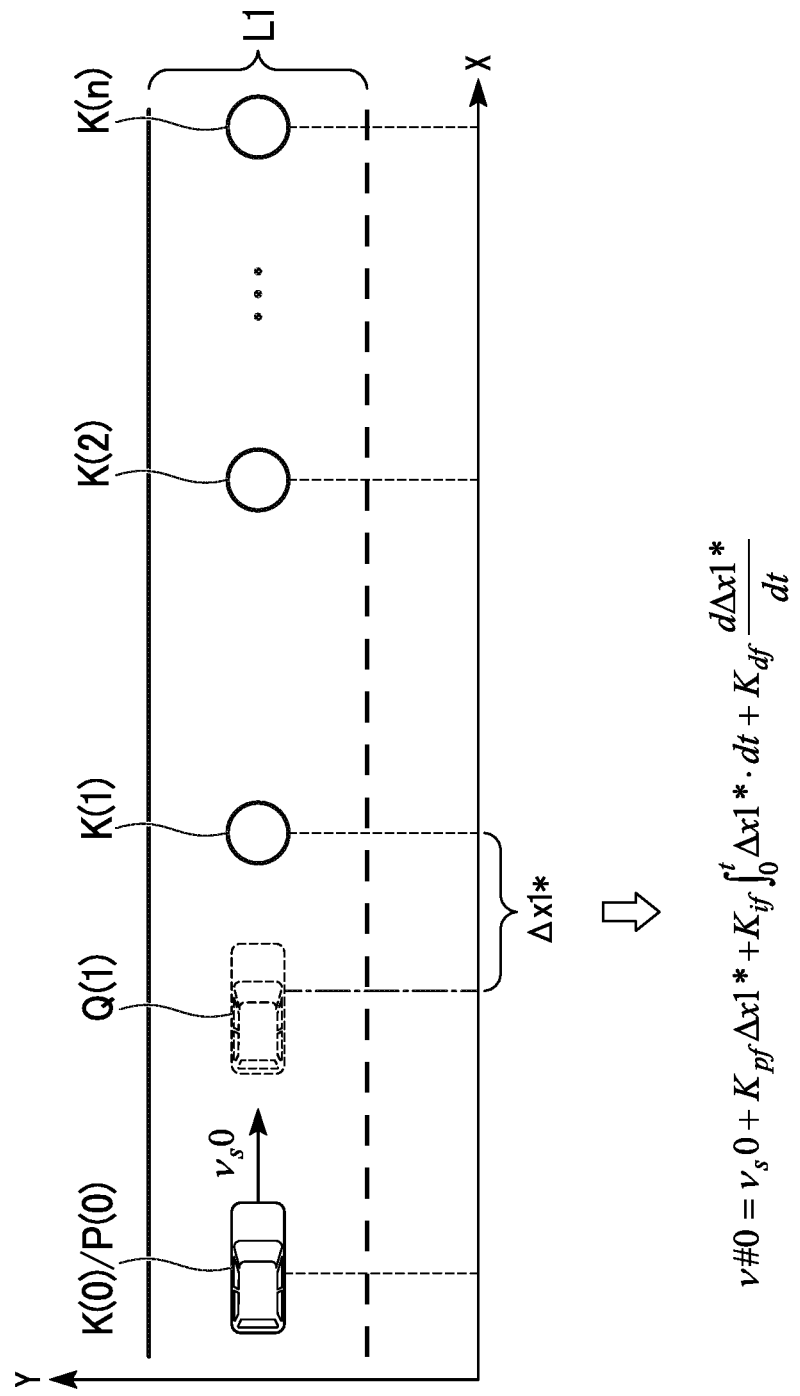
FIG. 13 is a diagram illustrating a state in which the derivation unit 132 derives a predicted difference between the target position K and a predicted arrival position Q in the second embodiment.

Hereinafter, processes of the derivation unit 132 and the correction unit 134 in the second embodiment will be described. FIG. 13 is a diagram illustrating a state in which the derivation unit 132 derives a predicted difference between the target position K and the predicted arrival position Q in the second embodiment. In FIG. 13, a horizontal axis X represents a vehicle traveling direction of the position of the own vehicle M and a vertical axis Y represents a direction perpendicular to the vehicle traveling direction, i.e., a lane width direction. In the description of FIG. 13, a position of the lane width direction will be described as if it were fixed without displacement.

That is, a target position for every predetermined time $\Delta t$ is indicated by displacements K(0), K(1), K(2), . . . along the X-axis and the position of the own vehicle M is similarly indicated by P(0), P(1), P(2), . . . along the X-axis without considering the position of the lane width direction. Also, the predicted arrival position Q of the own vehicle M is similarly indicated by Q(0), Q(1), Q(2), . . . along the X-axis. The own vehicle M will be described as if it were located at the target position K(0) at a current time in FIG. 13 (K(0) and P(0) match).

For example, it is assumed that the own vehicle M travels at the certain secondary target speed $v_s$0 in a period from a current time t0 to t1 and the own vehicle M is located at the predicted arrival position Q(1) at a point of time t1. This means that a delay is caused for the next scheduled target position K(1) at which the own vehicle M will arrive after the target position K(0) (current position P(0)) when the own vehicle M travels at the secondary target speed $v_s$0. In this case, the derivation unit 132 derives a predicted difference $\Delta x1^*$ between the target position K(1) and the predicted arrival position P(1) of the own vehicle M at the time t1.

The correction unit 134 corrects the secondary target speed $v_s$0 and generates the final target speed v#0 by applying the predicted difference $\Delta x1^*$ to the following Equation (2). In Equation (2), $K_{pf}$ denotes a proportional gain, $K_{if}$ denotes an integral gain, and $K_{df}$ denotes a derivative gain, and these parameters are used when the final target speed v#i is generated using the difference $\Delta xi^*$ between the target position P(i) and the predicted arrival position Q(i) of the own vehicle M. These parameters of $K_{pf}$, $K_{if}$, and $K_{df}$ may be the same as $K_{pn}$, $K_{in}$, and $K_{dn}$ of the above-mentioned Equation (1).

[Math. 2]

$$v\#i = v_s i + K_{pf}\Delta xi^* + K_{if}\int_0^t \Delta xi^* \cdot dt + K_{df}\frac{d\Delta xi^*}{dt} \qquad (2)$$

Thereby, the vehicle control apparatus 100 can cause the own vehicle M to travel at a speed for which a delay is previously expected in a phase of time t0.

Also, the correction unit 134 may obtain the final target speed v#i by correcting the secondary target speed $v_s$ so that the own vehicle M travels a distance, which is obtained by adding the predicted difference $\Delta xi^*$ derived by the derivation unit 132 to a distance (K(n)−K(i)) from the target position K(i) at which the own vehicle M should be located at the time ti to the target position K(n) at which the own vehicle M should be located at the final time tn, for a time of (T−$\Delta t$).

Also, the correction unit 134 may correct the secondary target speed $v_s$ calculated by the target speed calculation unit 130 on the basis of both the difference between the target position K and the current position P and the predicted difference between the predicted arrival position Q and the target position K.

In this case, the correction unit corrects the secondary target speed $v_s$i and generates the final target speed v#i on the basis of the following Equation (3).

[Math. 3]

$$v\#i = v_s i + K_{pn}\Delta xi + K_{in}\int_0^t \Delta xi \cdot dt + K_{dn}\frac{d\Delta xi}{dt} + \\ K_{pf}\Delta xi+1^* + K_{if}\int_0^t \Delta xi+1^* \cdot dt + K_{df}\frac{d\Delta xi+1^*}{dt} \quad (3)$$

Figure 14:
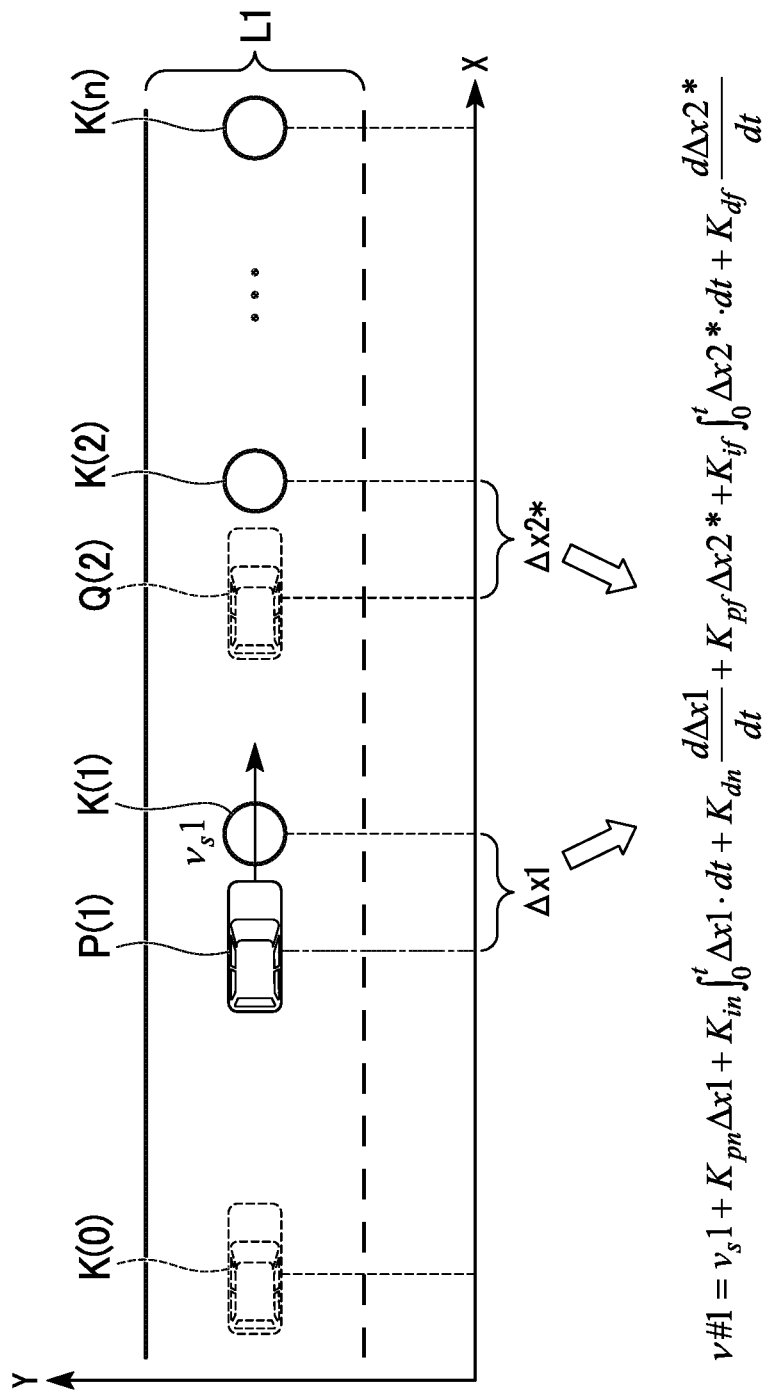
FIG. 14 is a diagram illustrating a state in which the own vehicle M in a situation of FIG. 13 has further traveled for the predetermined time Δt.

FIG. 14 is a diagram illustrating a state in which the own vehicle M in the above-mentioned situation of FIG. 13 has further traveled for the predetermined time Δt. In the illustrated example, a situation in which the own vehicle M travels at the final target speed v#0 generated by the correction unit 134 and the own vehicle M is located at the current position P(1) in front of the target position K(1) at the point of time t1 is shown. In this case, the derivation unit 132 derives a predicted difference Δx2* between a predicted arrival position Q(2) at which the own vehicle M is predicted to arrive when the own vehicle M travels for the predetermined time Δt according to the secondary target speed $v_s$1 calculated by the target speed calculation unit 130 in correspondence with the target position K(1) and the next scheduled target position K(2) at which the own vehicle M will arrive after the target position K(1). Also, the derivation unit 132 derives a difference Δx1 between the target position K(1) and the current position P(1) of the own vehicle M as in the above-mentioned first embodiment.

The correction unit 134 corrects the secondary target speed $v_s$1 by, for example, applying both the difference Δx1 derived by the derivation unit 132 and the predicted difference Δx2* to the above-mentioned Equation (3), and determines the final target speed v#1. Thereby, the vehicle control apparatus 100 can cause the own vehicle M to travel at a speed in consideration of both a delay occurring in a phase of time t1 and a predicted delay occurring in the phase of time t2. Also, the correction unit 134 may determine the final target speed v#1 by correcting the secondary target speed $v_s$1 using only the predicted difference Δx2* between the predicted arrival position Q(2) and the target position K(2).

Figure 15:
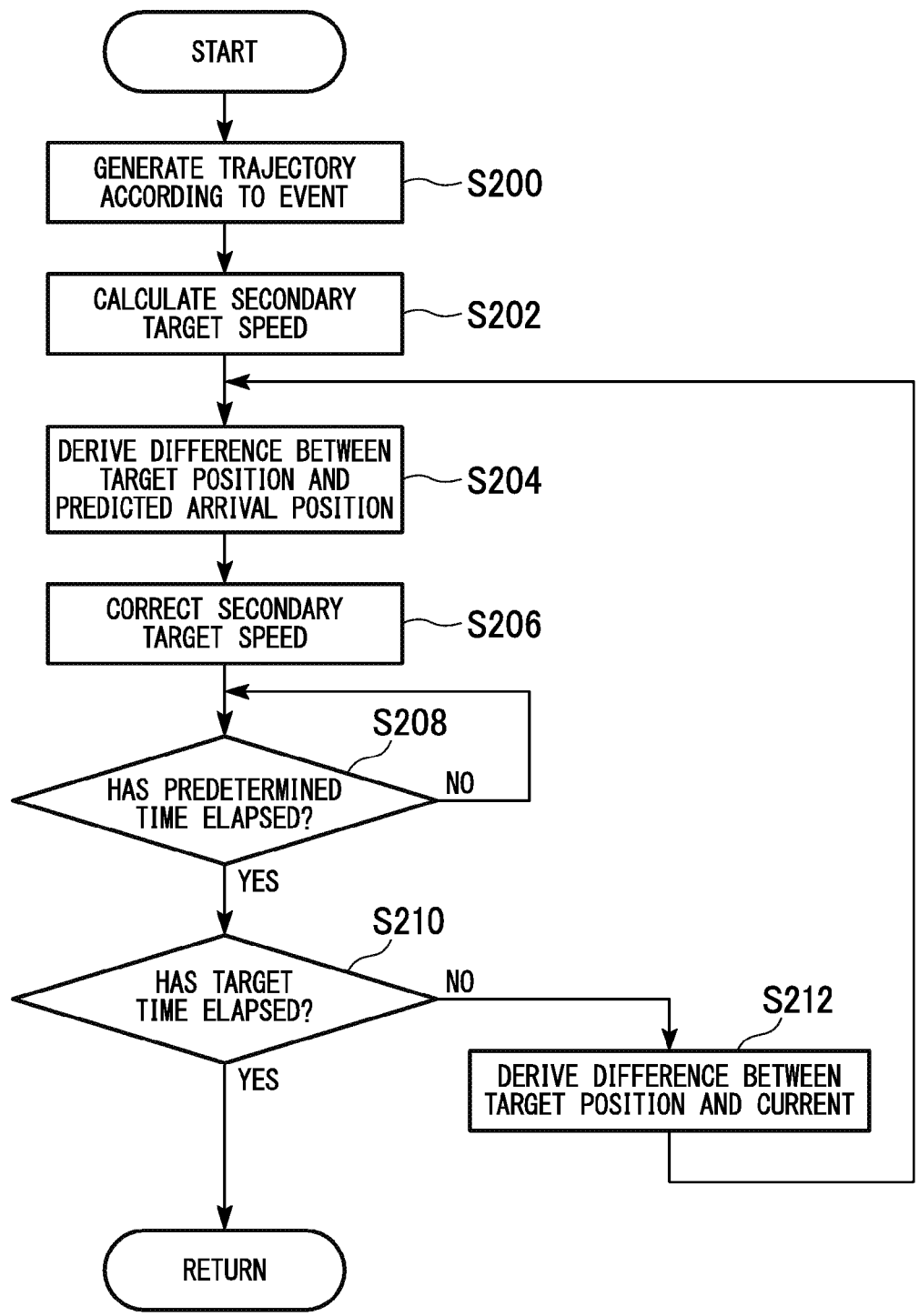
FIG. 15 is a flowchart illustrating an example of a flow of a process of the vehicle control apparatus 100 in the second embodiment.

FIG. 15 is a flowchart illustrating an example of a flow of a process of the vehicle control apparatus 100 in the second embodiment. The process of the flowchart is performed, for example, in a state in which the action plan generation unit 106 has generated an action plan, and is iteratively performed in a predetermined cycle.

First, the first trajectory generation unit 112 or the second trajectory generation unit 126 generates a trajectory according to an event performed by the traveling control unit 136 (step S200). Next, the target speed calculation unit 130 calculates the secondary target speed $v_s$ of the own vehicle M on the basis of the primary target speed $v_f$ set at each target position K of the trajectory generated by the first trajectory generation unit 112 or the second trajectory generation unit 126 (step S202).

Next, the derivation unit 132 derives a predicted difference Δx(i+1)* between a predicted arrival position Q(i+1) at which the own vehicle M is predicted to arrive when the own vehicle M travels for the predetermined time Δt according to the secondary target speed $v_s$ and the next scheduled target position K(i+1) at which the own vehicle M will arrive after the target position K(i) (step S204). Next, the correction unit 134 corrects the secondary target speed $v_s$i calculated by the target speed calculation unit 130 on the basis of the predicted difference Δx(i+1)* between the predicted arrival position Q(i+1) and the target position K(i+1) (step S206)

Next, a functional unit (for example, the derivation unit 132) of the vehicle control apparatus 100 determines whether the target time T has elapsed (step S210) when the predetermined time Δt has elapsed (step S208; Yes). If the target time T has not elapsed, i.e., if the own vehicle M has not reached the final target position K(n) of the trajectory, the derivation unit 132 derives a difference between the target position K(i+1) and the current position P(i+1) of the own vehicle (step S212) and returns to the process of step S204 by incrementing an internal parameter i by 1. Thereby, the correction unit 134 can correct the secondary target speed $v_s$i on the basis of both the difference between the target position K and the current position P and the predicted difference between the predicted arrival position Q and the target position. K in the process of step S206. On the other hand, if the target time T has elapsed, i.e., if the own vehicle M has reached the final target position K(n) of the trajectory, the vehicle control apparatus 100 ends the process of the flowchart.

According to the vehicle control apparatus 100 in the above-described second embodiment, it is possible to more precisely move the vehicle to a desired position at a desired timing by correcting the secondary target speed $v_s$ calculated by the target speed calculation unit 130 on the basis of one or both of a predicted difference between a predicted arrival position Q at which the own vehicle M is predicted to arrive when the own vehicle M travels at the secondary target speed $v_s$ and the target position K and the difference between the target position K and the current position P of the own vehicle M.

Hereinafter, another embodiment (a modified example) will be described.

The above-mentioned first trajectory generation unit 112 and second trajectory generation 126 may generate a trajectory of an entire route up to a destination input to the navigation apparatus 50. Thereby, the vehicle control apparatus 100 can cause the own vehicle M to travel while performing speed correction in an entire section of the route up to the destination.

Also, the target speed calculation unit 130 may calculate acceleration or jerk as a target value in place of a speed. In this case, the correction unit 134 corrections the acceleration or the jerk on the basis of a difference derived by the derivation unit 132.

While modes for carrying out the present invention have been described above using embodiments, the present invention is not limited to the embodiments. Various modification and substitutions can be made without departing from the spirit or scope of the present invention.

What is claimed is:

1. A vehicle control apparatus comprising:
   a trajectory generation unit, a target speed calculation unit, a traveling control unit, a derivation unit, and a correction unit, each unit comprising a software function unit which functions by a central processing unit or a hardware function unit including an application specific integrated circuit,
   the trajectory generation unit being configured to generate a locus of a position of an own vehicle for each predetermined time in a future as a trajectory of the own vehicle;
   the target speed calculation unit being configured to calculate a target speed of the own vehicle for each position on the trajectory generated by the trajectory generation unit;

the traveling control unit being configured to control traveling of the own vehicle on the basis of the target speed calculated by the target speed calculation unit;

the derivation unit being configured to
derive a first difference between a position on the trajectory generated by the trajectory generation unit and a current position of the own vehicle every time the predetermined time elapses, and derive a second difference between the position on the trajectory generated by the trajectory generation unit and a predicted arrival position of the own vehicle which is predicted where the own vehicle arrives after the predetermined time lapses if the own vehicle travels on the basis of the target speed calculated by the target speed calculation unit; and the correction unit being configured to correct the target speed calculated by the target speed calculation unit on the basis of one or both of the first difference and the second difference derived by the derivation unit.

2. The vehicle control apparatus according to claim 1, wherein the target speed calculation unit advances a time phase to calculate the target speed on the basis of a primary target speed for each position derived from the position on the trajectory generated by the trajectory generation unit.

3. The vehicle control apparatus according to claim 1, wherein when the own vehicle changes lanes, the correction unit corrects the target speed calculated by the target speed calculation unit on the basis of one or both of the first difference and the second difference derived by the derivation unit.

4. A vehicle control method of an on-vehicle computer having a central processing unit which executes a program, the method comprising:
operating the on-vehicle computer to
generate a locus of a position of an own vehicle for each predetermined time in a future as a trajectory of the own vehicle;

calculate a target speed of the own vehicle for each position on the generated trajectory;

control traveling of the own vehicle on the basis of the calculated target speed;

derive a first difference between a position on the generated trajectory and a current position of the own vehicle every time the predetermined time elapses;

derive a second difference between the position on the trajectory and a predicted arrival position of the own vehicle which is predicted where the own vehicle arrives after the predetermined time lapses if the own vehicle travels on the basis of the target speed; and correct the calculated target speed on the basis of one or both of the first difference and the second difference.

5. A vehicle control program provided in a computer readable medium including instructions for an on-vehicle computer to:
generate a locus of a position of an own vehicle for each predetermined time in a future as a trajectory of the own vehicle;

calculate a target speed of the own vehicle for each position on the generated trajectory;

control traveling of the own vehicle on the basis of the calculated target speed;

derive a difference between a position on the generated trajectory and a current position of the own vehicle every time the predetermined time elapses;

derive a second difference between the position on the trajectory and a predicted arrival position of the own vehicle which is predicted where the own vehicle arrives after the predetermined time lapses if the own vehicle travels on the basis of the target speed; and correct the calculated target speed on the basis of one or both of the first difference and the second difference.

* * * * *